United States Patent
Albert et al.

(10) Patent No.: US 10,872,386 B2
(45) Date of Patent: Dec. 22, 2020

(54) PREDICTIVE SEGMENTATION OF CUSTOMERS

(71) Applicant: C3.ai, Inc., Redwood City, CA (US)

(72) Inventors: Adrian Albert, San Francisco, CA (US); Mehdi Maasoumy Haghighi, Redwood City, CA (US)

(73) Assignee: C3.ai, Inc., Redwood City, CA (US)

( * ) Notice: Subject to any disclaimer, the term of this patent is extended or adjusted under 35 U.S.C. 154(b) by 957 days.

(21) Appl. No.: 15/380,768

(22) Filed: Dec. 15, 2016

(65) Prior Publication Data

US 2017/0178256 A1    Jun. 22, 2017

Related U.S. Application Data

(60) Provisional application No. 62/269,793, filed on Dec. 18, 2015.

(51) Int. Cl.
*G06Q 50/06* (2012.01)
*G06Q 10/06* (2012.01)
(Continued)

(52) U.S. Cl.
CPC ............ *G06Q 50/06* (2013.01); *G06N 5/003* (2013.01); *G06N 5/022* (2013.01); *G06N 7/005* (2013.01);
(Continued)

(58) Field of Classification Search
CPC .......................... G06Q 50/06; G06Q 30/0204
See application file for complete search history.

(56) References Cited

U.S. PATENT DOCUMENTS

| 7,542,960 B2 * | 6/2009 | Basak ................. G06K 9/6282 700/7 |
| 7,698,163 B2 | 4/2010 | Reed et al. |

(Continued)

FOREIGN PATENT DOCUMENTS

WO    WO-2017106544 A1    6/2017

OTHER PUBLICATIONS

Raquel Florez-Lopez et al, Marketing Segmentation Through Machine Learning Models An Approach Based on Customer Relationship Management and Customer Profitability Accounting, Social Science Computer Review 2009 27: p. 96-117 (Year: 2008).*

(Continued)

*Primary Examiner* — Andre D Boyce
(74) *Attorney, Agent, or Firm* — Wilson Sonsini Goodrich & Rosati

(57) ABSTRACT

A computer system receives customer records listing customer attributes and an adoption status of the customer, such as whether the customer has enrolled in a particular energy efficiency program. An initial set of patterns are identified among the customer records, such as according to a decision tree. The initial set is pruned to obtain a set of patterns that meet minimum support and effectiveness and maximum overlap requirements. The patterns are assigned to segments according to an optimization algorithm that seeks to maximize the minimum effectiveness of each segment, where the effectiveness indicates a number of customers matching the pattern of each segment that have positive adoption status. The optimization algorithm may be a bisection algorithm that evaluates a linear-fractional integer program (LFIP-F) to iteratively approach an optimal distribution of patterns.

21 Claims, 12 Drawing Sheets

(51) Int. Cl.
| | |
|---|---|
| G06N 5/00 | (2006.01) |
| G06N 7/00 | (2006.01) |
| G06N 20/20 | (2019.01) |
| G06N 5/02 | (2006.01) |

(52) U.S. Cl.
CPC ....... *G06N 20/20* (2019.01); *G06Q 10/06375* (2013.01)

(56) References Cited

U.S. PATENT DOCUMENTS

| | | | |
|---|---|---|---|
| 10,387,787 B1* | 8/2019 | Cessna | G06N 7/005 |
| 2006/0229931 A1* | 10/2006 | Fligler | G06Q 10/0639 705/7.38 |
| 2007/0094067 A1 | 4/2007 | Kumar et al. | |
| 2012/0095794 A1 | 4/2012 | Guthridge | |
| 2015/0046130 A1 | 2/2015 | Fei et al. | |
| 2015/0081384 A1 | 3/2015 | Zeifman | |
| 2015/0161233 A1 | 6/2015 | Flora et al. | |
| 2016/0164792 A1* | 6/2016 | Oran | H04L 47/283 370/236 |
| 2016/0189082 A1* | 6/2016 | Garrish | G06Q 10/06393 705/7.39 |
| 2016/0292705 A1* | 10/2016 | Ayzenshtat | G06Q 30/0204 |
| 2017/0099525 A1* | 4/2017 | Ray | H04N 21/252 |
| 2017/0104875 A1* | 4/2017 | Im | H04M 3/5191 |

OTHER PUBLICATIONS

Cho et al, A methodology for Internet Customer Segmentation using Decision Trees, Graduate School of Management, Korea Advanced Institute of Science and Technology, (KIIS 2003 springs) pp. 206-213 (Year: 2003).*

EP16876709.3 Extended European Search Report dated May 3, 2019.

Albert et al. Cost-of-Service Segmentation of Energy Consumers. IEEE Transactions on Power Systems, vol. 29, No. 6, pp. 2795-2803, Nov. 2014.

Albert et al. Smart Meter Driven Segmentation: What Your Consumption Says About You. Power Systems, IEEE Transactions on 28(4):4019-4030 (2013).

Albert et al. Thermal profiling of residential energy use. IEEE Transactions on Power Systems 30(2):602-611 (2015).

Alzate et al. Identifying Customer Profiles in Power Load Time Series Using Spectral Clustering. Artificial Neural Networks—ICANN 2009. ICANN 2009. Lecture Notes in Computer Science, vol. 5769. Springer, Berlin, Heidelberg.

Armel, et al. Is disaggregation the holy grail of energy efficiency? The case of electricity. Energy Policy, 52:213-234, Oct. 2012.

Bhatnagar et al. A latent class segmentation analysis of e-shoppers. Journal of Business Research, 2004, vol. 57, issue 7, 758-767.

Dody, et al. Convex Optimization. Cambridge University Press. 2004. pp. 318-343.

Espinoza et al. Short-term load forecasting, profile identification, and customer segmentation: a methodology based on periodic time series. IEEE Transactions on Power Systems 20(3):1622-1630 (2005).

Feng et al. A Deterministic Algorithm for Min-max and Max-min Linear Fractional Programming Problems. 4(2):134-141 (2011).

Figueiredo et al. An electric energy consumer characterization framework based on data mining techniques. Power Systems, IEEE Transactions on 20(2):596-602 (2005).

Flath et al. Cluster Analysis of Smart Metering Data—An Implementation in Practice. Business & Information Systems Engineering 4(1):31-39 (2012).

Frankel et al. Using a consumer-segmentation approach to make energy-efficiency gains in the residential market. McKinsey and Co. Research Study (2013). 7 pages.

Houde et al. Real-time Feedback and Electricity Consumption: A Field Experiment Assessing the Potential for Savings and Persistence. The Energy Journal vol. 34, No. 1 (2013), pp. 87-102.

Kavousian et al. Determinants of residential electricity consumption: Using smart meter data to examine the effect of climate, building characteristics, appliance stock, and occupants' behavior. Energy 55:184-194 (2013).

Kavousian et al. Ranking appliance energy efficiency in households: Utilizing smart meter data and energy efficiency frontiers to estimate and identify the determinants of appliance energy efficiency in residential buildings. Energy and Buildings 99:220-230 (2015).

Kolter, et al. Approximate Inference in Additive Factorial HMMs with Application to Energy Disaggregation. Proceedings of Machine Learning Research 22:1472-1482 (2012).

Kwac et al. Household Energy Consumption Segmentation Using Hourly Data. EE Transactions on Smart Grid 5(1):420-430 (2014).

Lheureux et al. Predicts 2015: Digital Business and Internet of Things Add Formidable Integration Challenges. Gartner, Nov. 11, 2014.

Li et al. Governing millions meters data. Power & Energy Society General Meeting, 2015 IEEE Jul. 26-30, 2015.

Liu et al. Streamlining Smart Meter Data Analytics. Proceedings of the 10th Conference on Sustainable Development of Energy, Water and Environment Systems (2015). 15 pages.

Middleton, et al. Forecast: Internet of Things, Endpoints and Associated Services, Worldwide, 2014. Gartner, Feb. 16, 2015.

Patel et al. Pricing Residential Electricity Based on Individual Consumption Behaviors. arXiv:1312.1243 [math.OC]. Submitted Dec. 4, 2013. Last revised Aug. 5, 2017.

PCT/US16/67002 International Search Report dated Mar. 10, 2017.

Räsänen et al. Feature-Based Clustering for Electricity Use Time Series Data. In: Kolehmainen M., Toivanen P., Beliczynski B. (eds) Adaptive and Natural Computing Algorithms. ICANNGA 2009. Lecture Notes in Computer Science, vol. 5495, pp. 401-412. Springer, Berlin, Heidelberg (2009).

Schaible et al. Recent developments in fractional programming: Single-ratio and max-min case. Journal of nonlinear and convex analysis Jan. 2004. 11 pages.

Smith et al. A Simple Way to Use Interval Data to Segment Residential Customers for Energy Efficiency and Demand Response Program Targeting. ACEEE Summer Study on Energy Efficiency in Buildings pp. 5-374 to 5-386 (2012).

Tsekouras et al. Two-Stage Pattern Recognition of Load Curves for Classification of Electricity Customers. 22(3):1120-1128 (2007).

Yan et al. How much can Behavioral Targeting Help Online Advertising? Proceedings of the 18th international conference on World Wide Web ACM pp. 261-270 (2009).

\* cited by examiner

Example patterns: High Consumption
Spouse Combined Age less than 53.50 &
kWh-Spring-2014 less than 277.19 &
Home Total Rooms greater than 6.50 &
kWh annual greater than 5893.38 &
* Rate: 0.104; Support: 2124 * kWh annual greater than 6009.88 &
kWh-Summer-2013 greater than 726.16 &
Birth Year greater than 1962 &
Presence of Child Age 0-18 Y3 is Confirmed &
Year Built greater than 1967 &
* Rate: 0.112; Support: 56398 *

Example patterns: Cost Conscious
Home Total Rooms greater than 6.50 &
Dwelling Type is Single Family &
Birth Year less than 1969 &
Home Total Rooms less than 9.50 &
* Rate: 0.129; Support: 21641 *

Spouse Gender Code is Female &
Dwelling Type is Single Family &
Person Type is Other &
Current Home Value greater than 8269,015 &
* Rate: 0.103; Support: 6228 *

FIG. 9

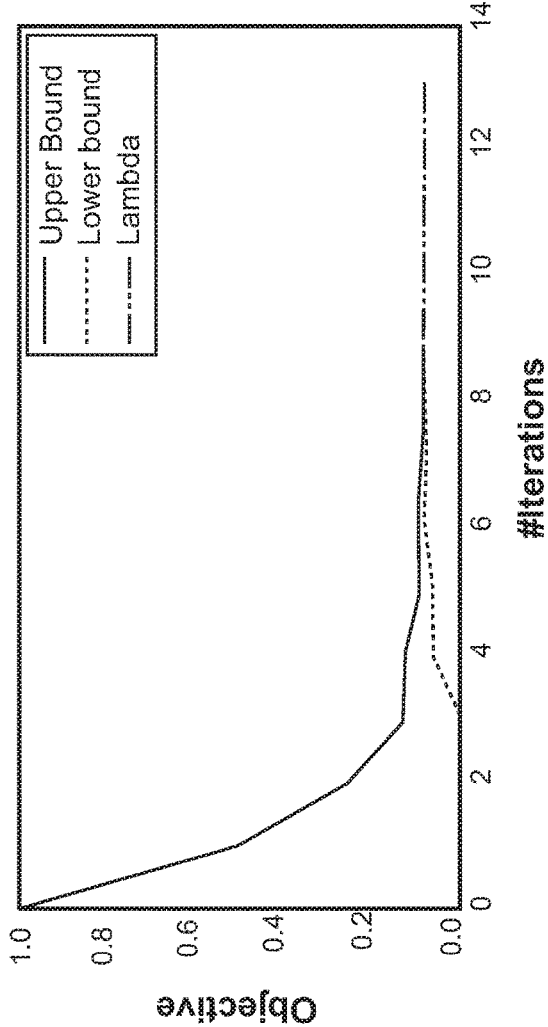

FIG. 10

======== High Consumption ========
Rate: 0.199; Support: 2062
kWh-Summer-2014 less than 410 &
  kWh annual greater than 4420 &
    kWh-Autumn-2013 greater than 553 &
      kWh-Summer-2013 greater than 917 &
        EST CUR LOAN-TO-VALUE RATIO RG greater than 2.50 &
          * Rate: 0.277; Support: 786 *
--- OR ---
Presence of Child Age 0-18 is Confirmed &
  Spouse Religion is not Catholic &
    kWh-Spring-2014 greater than 275 &
      Language is Hindi &
        kWh-Summer-2013 greater than 526.50 &
          * Rate: 0.187; Support: 1334 *

======== Cultural Drivers ========
Rate: 0.147; Support: 3971
Spouse Combined Age less than 53.50 &
  Ethnicity is not Hispanic &
    kWh annual greater than 4530 &
      General Ethnicity is South Asian &
        Language is not English &
          * Rate: 0.148; Support: 3110 *
--- OR ---
Marital Status is not Single &
  Home Heat Ind is not No heat &
    County Income Percentile greater than 68.50 &
      Spouse Language is Hindi &
        Language is not Urdu &
          * Rate: 0.156; Support: 1652 *

======== Home Improver ========
Rate: 0.102; Support: 78381
ESTIMATED AVAILABLE EQUITY greater than $262,500 &
  ESTIMATED AVAILABLE EQUITY greater than $306,870 &
    Est Household Income V5 greater than $75,000 &
      General Ethnicity is South Asian &
        kWh-Winter-2013 less than 1643.43 &
          * Rate: 0.160; Support: 1755 *
--- OR ---
ESTIMATED AVAILABLE EQUITY greater than $262,500 &
  ESTIMATED AVAILABLE EQUITY greater than $306,870 &
    kWh-Autumn-2013 greater than 367 &
      Home Total Rooms greater than 6.50 &
        State Estimated Income Index greater than 112.50 &
          * Rate: 0.102; Support: 77723 *

======== Green Advocate ========
Rate: 0.119; Support: 47683
Est Household Income V5 greater than $75,000 &
  kWh-Autumn-2013 greater than 358.66 &
    Presence of Child Age 0-18 is Confirmed &
      State Estimated Income Index greater than 259 &
        Dwelling Type is not Multi-Family & Condominiums &
          * Rate: 0.129; Support: 36024 *
--- OR ---
EducationSpouse is High School Diploma &
  Est Household Income V5 greater than $75,000 &
    County Income Percentile greater than 52.50 &
      ESTIMATED AVAILABLE EQUITY less than $262,500 &
        Birth Year greater than 1967 &
          * Rate: 0.102; Support: 12708 *

======== Cost Conscious ========
Rate: 0.124; Support: 73204
Inc: Family Inc State Decile greater than 5.50 &
  Dwelling Type is not Marginal Multi-Family &
    Dwelling Type is Single Family &
      Spouse Combined Age less than 53.50 &
        Combined Age less than 41.50 &
          * Rate: 0.176; Support: 26720 *
--- OR ---
Est Household Income greater than $75,000 &
  Occupation Group is not Engineering/Computers/Math &
    Est Household Income less than $100,000 &
      Numer of persons on record greater than 1.50 &
        County Estimated Income Index less than 121.50 &
          * Rate: 0.101; Support: 50326 *

FIG. 14

PREDICTIVE SEGMENTATION OF CUSTOMERS

This application claims the benefit of U.S. Provisional Application Ser. No. 62/269,793, filed Dec. 18, 2015, and entitled "Predictive Segmentation of Energy Consumers", the entire contents of which are hereby incorporated by reference.

BACKGROUND

Field of the Invention

This invention relates to a computer algorithm for analyzing energy consumers.

Background of the Invention

In recent years, energy utility companies have become ever keener on improving their relationship with a customer base that has traditionally been disengaged with their electricity provider. In the past, both energy companies and their consumers have understood the role of a utility as "keeping the lights on." However, current technology trends and shifting customer attitudes (particularly fueled by the rise in consumer-facing Internet companies that excel at understanding and anticipating the preferences of their customers) have led to an increased interest at utilities to engage with their customers.

Compounding these trends are the increase in data availability (both high-granularity consumption data collected through sensing infrastructure such as smart meters and in other "meta-data" on the consumers themselves) and computational methods (e.g., Li and Yang (2015), Liu and Nielsen (2015)) to process this data. As such, energy utilities increasingly rely on analytic techniques that may provide them with ways to increase their customer satisfaction and engagement, as well as participation to environmentally-friendly programs within their customer base. Customer segmentation is a cornerstone of the marketing toolbox of organizations large and small as a technique for understanding customers and for identifying ways to act upon that understanding. It is used heavily in marketing (a comprehensive review is in Association (2014)), online ads (e.g., Yan et al. (2009)), or e-retail (e.g., Bhatnagar and Ghose (2004)) to name a few applications.

As utilities strive to develop a more personal and modern relationship with their customers, they've enthusiastically embraced segmentation as a means to tailor their communications about efficiency measures and other programs as to increase participation and engagement. Most market segmentation techniques employed in practice focus on the application of fixed rule-sets. For example, consumers who live in large homes and have children are assigned to a "high consumption" category, whereas those who subscribe to environmentalist magazines are ascribed to the "green advocates" group. Typically, these rules stem from counter-factual or anecdotal experience, behavioral studies, or small-scale psychology experiments, and are seen as "accepted fact" in practice. Being the result of distilled domain knowledge, such segmentation strategies are certainly valuable and should inform theory and practice.

The approach described herein provides an improved approach for segmenting energy consumers.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 9 is an example of patterns associated with two segments;

FIG. 10 is a plot of lower and upper bounds of segment effectiveness with respect to number of iterations;

FIG. 14 is a listing of segments and corresponding patterns according to the segmentation algorithm;

DETAILED DESCRIPTION

This application introduces a predictive segmentation technique for identifying sub-groups in a large population that are both homogeneous with respect to certain patterns in customer attributes, and predictive with respect to a desired outcome. The motivating setting is creating a highly-interpretable and intuitive segmentation and targeting process for customers of energy utility companies that is also optimal in some sense. In this setting, the energy utility wants to design a small number of message types to be sent to appropriately chosen customers who are likeliest to respond to the different types of communications. The proposed method uses consumption, demographics, and program enrollment data to extract basic predictive patterns using standard machine learning techniques. The method next defines a feasible potential assignment of patterns to a small number of segments described by expert guidelines and hypotheses about consumer characteristics, which are available from prior behavioral research. The algorithm then identifies an optimal allocation of patterns to segments that is both feasible and maximizes predictive power. The method is implemented on a large-scale dataset from a leading U.S. energy utility, and obtain segments of customers whose likelihood of enrollment is more than twice larger than that of the average population, and that are described by a small number of simple, intuitive rules.

1. OPERATING ENVIRONMENT AND OVERVIEW

Figure 1:
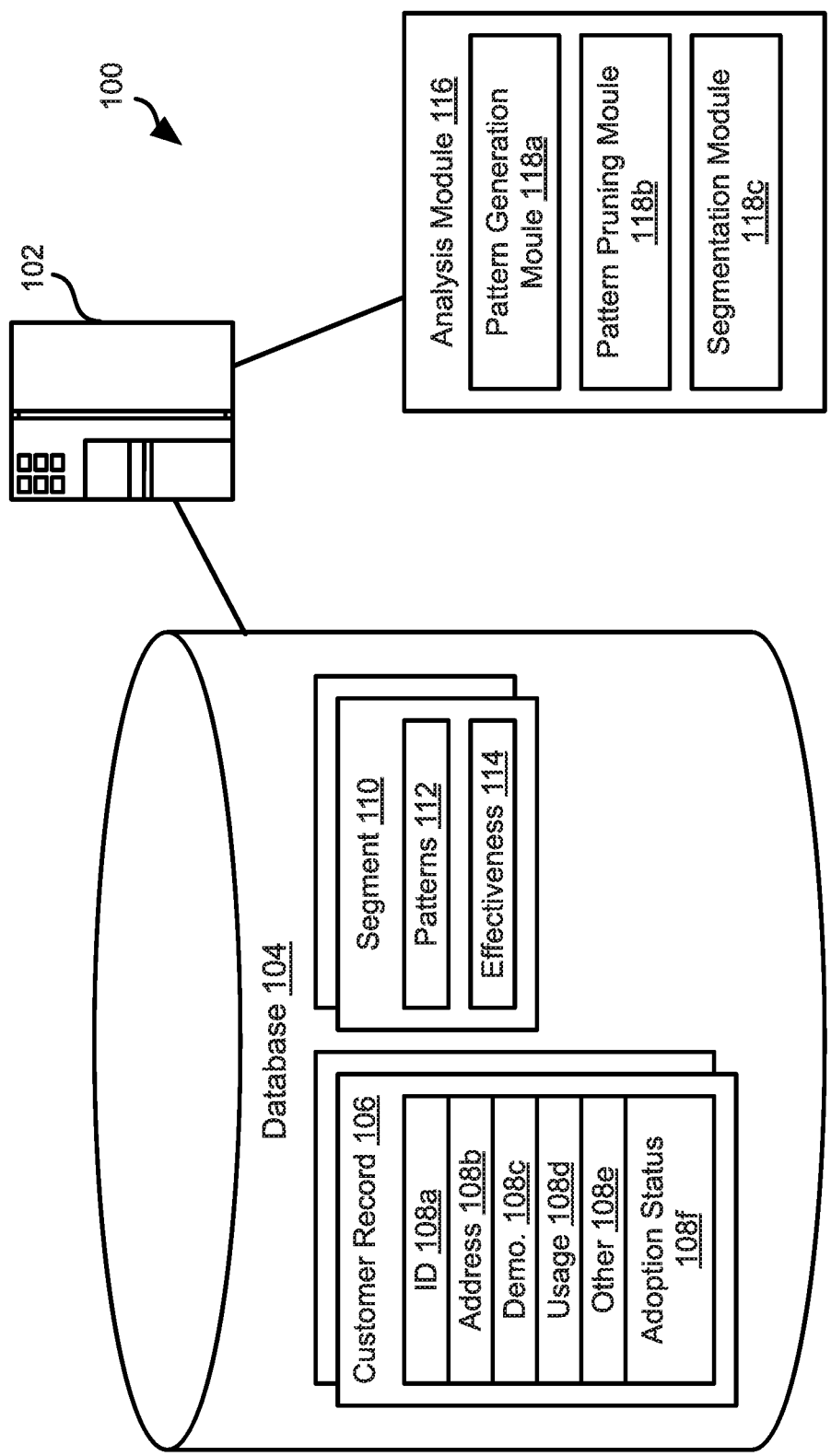
FIG. 1 is schematic block diagram of components for implementing predictive segmentation of customers in accordance with an embodiment of the present invention.

Referring to FIG. 1, the methods disclosed herein may be implemented by the illustrated operating environment 100. A server system 102, or other type of computer system may host or access a database 104. The server system 102 may also be replaced with a desktop or laptop computer or even a mobile device with sufficient computing power. The database 104 may include customer records 106 for a plurality of customers. The methods disclosed herein are described with respect to energy customers. Accordingly, each customer record 106 may include data for a single household or customer account, which may therefore include data for multiple individuals living together.

The customer records 106 may include such information as identifiers 108a of one or more customers in the form of names, account numbers, or other unique identifiers. The customer records 106 may include an address 108b of the customer and demographic information 108c for the one or more individuals associated with the customer record 106, such as age, income, gender, profession, education level, and any other information that may characterize a customer.

Where the methods disclosed herein are applied to energy customers, the customer record 106 may further include usage data 108d, e.g. the number of kilowatt hours used per year, month, or day. Usage data 108d may include a daily, monthly, or seasonal usage patterns obtained from analysis of power consumption data. In other applications, usage data 108d could include usage of another service or purchases of particular items or supplies.

The customer record 106 may include any other data 108e that is obtainable with respect to the customer that may be helpful in identifying patterns that describe types of costumers and customer behavior.

The methods disclosed herein are used to analyze data to determine patterns of customer data (demographic, usage, and other) that are predictive of the customer taking a particular action. In the case of energy customers, this may include enrollment in an energy efficiency program or taking other actions in order to reduce consumption or otherwise reduce the customer's environmental impact. Accordingly, the customer record 106 may further include one or more adoption status indicators 108f indicating whether the customer has elected to participate in a particular program. For example, the status 108f may be 1 if the customer elected to participate and 0 otherwise. In other embodiments, the adoption status may be one of a range of values indicating a degree of compliance with program guidelines or amount of money spent on a particular objective.

The database 104 may further store segments 110 that have a plurality of patterns 112 assigned thereto. Each segment 110 has an effectiveness 114 that is a measure of the number of customer records that have a positive adoption status 108f and that match one of the patterns 112 assigned to the segment 110.

The segments 110 may be defined by an analysis module 116 that implements the methods disclosed hereinbelow. In particular, the analysis module 116 may include a pattern generation module 118a. The pattern generation module 118a identifies series of attributes that co-occur in the customer records. As described below, patterns may be described with respect to thresholds for the values of various attributes in each customer record. As also described below, patterns may be generated using a decision tree or other pattern identification algorithm.

The analysis module 116 may further include a pattern pruning module 118b. As described below, the pattern pruning module 118b may prune patterns that do not meet a minimum support, effectiveness, or non-overlapping criteria. The analysis module may include a segmentation module 118c. The segmentation module 118c assigns patterns 112 that survive the pruning 118b to a segment 110 such that a set of segments 110 is obtained where the minimum effectiveness 114 of the segments has been increased through an algorithm that distributes the patterns among the segments.

Figure 2:
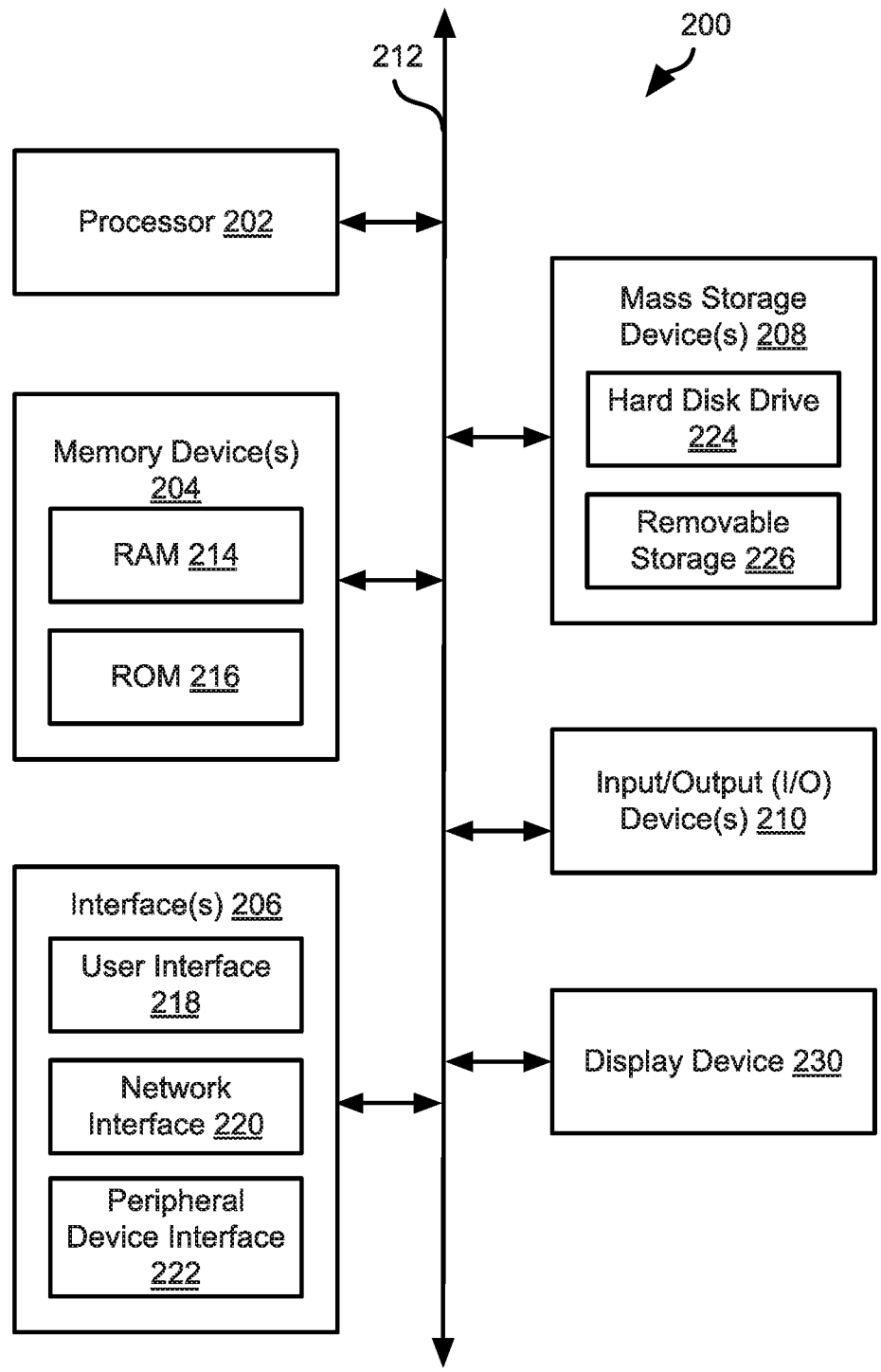
FIG. 2 is a schematic block diagram of a computing device.

FIG. 2 is a block diagram illustrating an example computing device 200. Computing device 200 may be used to perform various procedures, such as those discussed herein. The server system 102 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for pointing devices (mice, track pad, etc.), keyboards, and the like.

Bus 212 allows processor(s) 202, memory device(s) 204, interface(s) 206, mass storage device(s) 208, I/O device(s)

210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
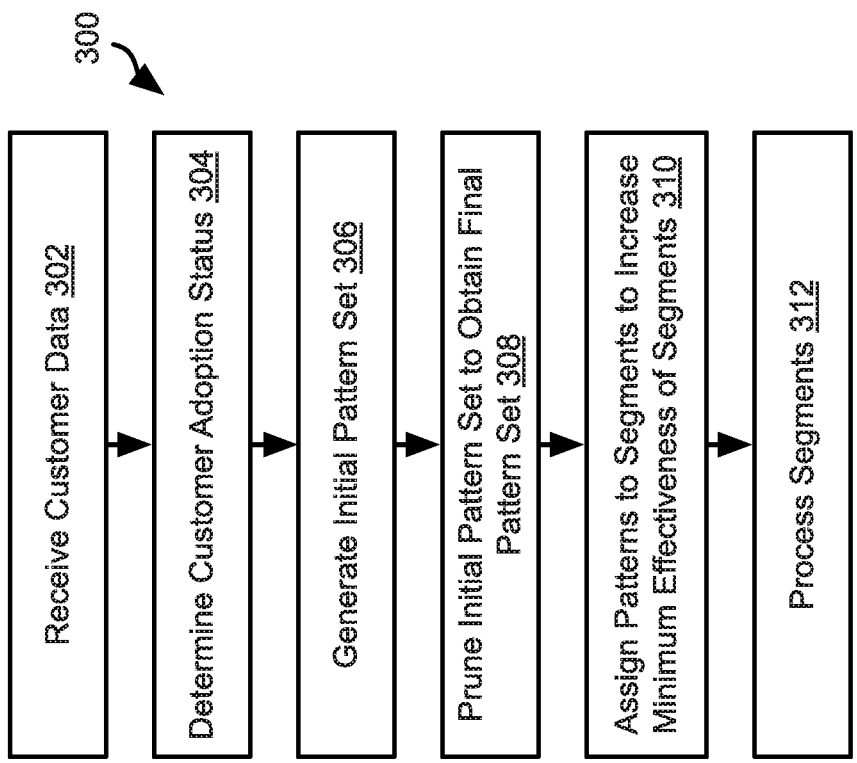
FIG. 3 is a process flow diagram of a method for performing predictive segmentation in accordance with an embodiment of the present invention.

Referring to FIG. 3, the server system 102 may execute the illustrated method 300. The method 300 may include receiving 302 customer data. This may include receiving the data over a period of time as data is gathered with respect to customers. The data received may include some or all of the data described above as being included in a customer record 106.

The method 300 may further include determining 304 customer adoption status. The adoption status 108f may be included in the customer records as received or received as part of a subsequent program of extending an offer to the customers and receiving responses. In either case, data is manually or automatically provided to the server system 102 that indicates the adoption status for each customer. In some embodiments, the method 300 may only be executed with respect to customers that received the offer.

Figure 5:
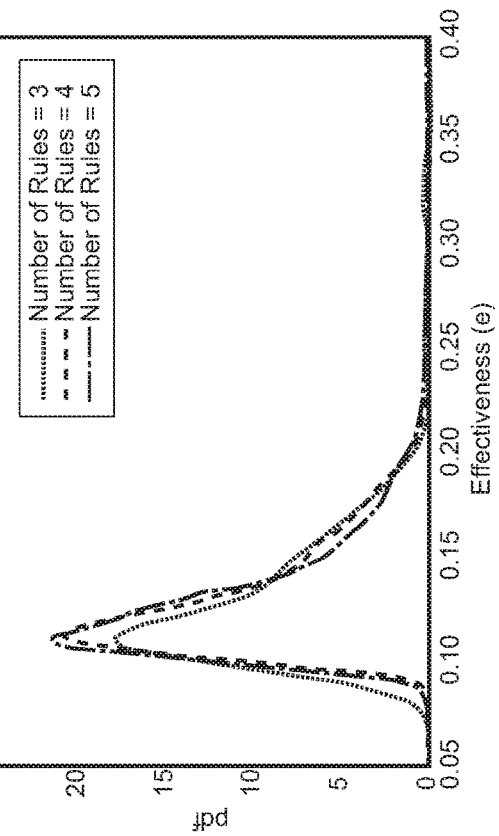
FIG. 5 is a plot of a distribution of pattern effectiveness vs. number of rules.

The method 300 may further include generating 306 an initial pattern set. For example, generating 306 an initial pattern set may include traversing a decision tree, as known in the art, wherein each node of the decision tree is an attribute value or range of attribute values corresponding to the attributes 108b-108e of the customer records 106. An example decision tree is shown in FIG. 5 and the generation of an initial pattern set is described in greater detail below in section 3.2 Extracting Predictive Patterns from Data and section 5.2 Predictive Patterns Extracted from Data.

The method 300 may further include pruning 308 the initial pattern set. This may include removing patterns that do not have sufficient support, i.e. an insufficient number of customer records 106 that match the pattern; patterns that do not have sufficient effectiveness, i.e. an insufficient number of customer records 106 that match the pattern and have a positive adoption status; and patterns having an above-threshold percentage of matching customer records that also match another pattern. A more detailed explanation of the pruning process is described below in section 3.2 Extracting Predictive Patterns from Data and section 5.2 Predictive Patterns Extracted from Data.

The method 300 may further include assigning 310 patterns to segments according to an algorithm that iteratively approaches a maximum for the minimum effectiveness of the segments, where effectiveness is a measure of how many customer records matching the patterns assigned to each segment have a positive adoption status. This may include executing an optimization algorithm, such as described below in section 3.1 Increasing the Minimum Effectiveness.

The segments may then be further processed 312. In particular, segments may be used for targeted marketing: advertisements may be formulated and transmitted only to customers matching the patterns of one segment in order to increase their effectiveness. The segments may also be used for visualizing customer behaviors or for any other business goal.

The algorithm implemented by the method 300 is described in greater detail below in Sections 2 through 3. Section 4 includes a summary of prior approaches and Section 5 illustrates experimental results using actual customer data.

Note that the following description is of an optimization algorithm that seeks to maximize the minimum effectiveness of segments. Accordingly references to "maximum," "optimal," "optimized," "minimal," and "minimum" shall be understood not to refer to an absolute or actual maximum, optimal, or minimal values, but rather the maximum, optimal, or minimum values determined subject to limitations of the disclosed algorithm and subject to performance of a finite number of iterations of the disclosed algorithm.

Specifically, to "maximize" a value, "maximization" of a value, and "maximum" of a value shall be understood to refer to an increase in the value as compared to a previous iteration of the disclosed algorithm or in the absence of performing the disclosed algorithm, except in cases where a closed set of values is considered and the maximum value in the closed set can be determined with certainty.

To "minimize" a value, "minimization" of a value, and "minimum" of a value shall be understood to refer to a decrease in the value as compared to a previous iteration of the disclosed algorithm or in the absence of performing the disclosed algorithm, except in cases where a closed set of values is considered and the minimum value in the closed set can be determined with certainty.

To "optimize" shall be understood to mean to find a value closer to an absolute optimum value than in the absence of the disclosed algorithm and shall not be understood to actually finding the absolute optimum value. Likewise, an "optimal" value shall be understood to be an approximately optimum value, where "approximately" refer to limits in representing in the accuracy of representing and performing mathematical operations on numbers, limits in what the disclosed algorithm can theoretically achieve, and limits in the number of iterations that can practically be performed.

2. PREDICTIVE SEGMENTATION

A transparent and useful segmentation strategy should achieve the following:
1. internalize existing, valuable domain knowledge and best practices so that practitioners can easily relate to and adopt it;
2. be interpretable and intuitive for non-technical program administrators at energy utilities, as well as useful for crafting marketing communications;
3. offer certain optimality guarantees in terms of effectiveness, i.e., be highly discriminative with respect to its purpose of identifying sub-groups whose members will be more likely to take action than consumers taken at random from the population at large.

To the first point, much expertise and practical experience exists at energy utilities that allows them to put forth hypotheses about certain high-level types of customers that they wish to identify from among their base. For example, most experienced program administrators would agree that "Green Advocate" consumers respond to other types of communications (emphasizing environmental impact) than those consumers who are more "Cost Conscious" (who may be responsive to arguments about monetary savings).

To the second point, the method may start from existing domain knowledge that associates certain variables with each given segment (e.g., "Green Advocates" might be defined by their income, household type, and level of education), and identify simple logical rules involving those variables that lead to the most effective segmentation strategy. Such intuitive segments should allow crafting appropriate messaging strategies. For example, consumers in the "Green Advocates" groups will receive messages that emphasize the environmental aspects of energy savings, while those consumers in the "High Consumption" category will be informed about ways in which they could reduce their large bills.

The challenge then becomes (as presented in the third point above) to develop an algorithmic segmentation method that internalizes the desiderata of points 1 and 2 while ensuring useful properties of the resulting segments as well as guarantees that the best possible segmentation satisfying the imposed structure has been achieved. The desired outcome is to maximize the impact of the marketing communications on energy efficiency program enrollment, i.e., target those customers that are more likely to enroll. As both tailoring communications and managing campaigns is costly, there is a real incentive to create messages for small number of segments, and to have those segments include consumers who are likely to take action.

2.1. Problem Setting

A population X consisting of N consumers is serviced by an operator (an energy utility company); for each consumer the utility observes a number of M features $x \in \mathbb{R}^M$ that comprise of both consumption and customer characteristics (such as socio-demographic and physical building attributes); as such the features data across all consumers is stored in a matrix $X \in \mathbb{R}^{N \times M}$. The utility also observes, for each consumer i, whether he has enrolled in any program in the past year, which is encoded as a binary variable y: $y_i=1$ if and only if customer i has enrolled.

The utility wishes to use the data (X, y) to identify K segments within the population that are "homogeneous" with respect to the attributes X, with the purpose of informing, simplifying, and increasing the effectiveness of targeted communications for demand-side efficiency program enrollment. Based on prior marketing research, the utility may have certain hypotheses as to what "types" of customers it services. This prior knowledge is assumed to be of the form:

"Green Advocates" have a relatively high income or at least a college degree.

"Home Improvers" are home owners or own a large equity share on their home.

Then the data (X, y) can be used to make these hypotheses specific by extracting a set $\mathcal{P}$ of V patterns, $\mathcal{P} = \{P_1 \ldots P_V\}$, that are both descriptive, in that the characteristics of the consumers they refer to exhibit these patterns, and predictive, in that the consumers who fall in a certain pattern are more likely to enroll than a consumer selected at random from the entire population. A pattern may therefore be defined to be a logical expression of the form:

$$P = \{x \in X | r_1(x) \& r_2(x) \& \ldots \}, \quad (1)$$

where the P's are base rules (logical statements). Hence a pattern is defined as a succession of conjunctions. Interchangeably the pattern may be referred to as the set of consumers that follow the logical definition of the pattern. We consider the base rules to be of the form:

$$r_j(x) := x_j \leq t_j \text{ or } r_j(x) := x_j \geq t_j. \quad (2)$$

As such, a base rule is defined by the variable $x_j$ (the j-th variable in x) it refers to, a direction (either "≥" or "≤"), and a threshold $t_j$ learned from data. We consider a rule $P_j(\bullet)$ to be consistent with a hypothesis if both the variable and the direction that define that rule match the hypothesis. Similarly, we define a pattern P to be δ-consistent with a hypothesis if it contains at least δ≥1 rules that are consistent with the hypothesis.

It is useful to define a coverage matrix C that summarizes the extent to which an item i is covered by pattern m:

$$c_{im} = \begin{cases} 1 & \text{if pattern } P_m \text{ covers consumer } i \\ 0 & \text{otherwise} \end{cases} \quad (3)$$

The effectiveness of a pattern P may be computed as the (empirical) enrollment probability of consumers covered by that pattern:

$$q(P) = \frac{\sum_{i \in P} 1\{y_i = 1\}}{|P|}. \quad (4)$$

With the setup above, we define K segments as collections of patterns, $S_k \subset \mathcal{P} < \mathcal{P}$) such that every pattern in each segment is δ-consistent with the hypotheses that define that segment. Let $B \in \mathbb{R}^{M \times K}$ define the (known) consistency matrix that describes the allowed relationship between segments and patterns:

$$b_{mk} = \begin{cases} 1 & \text{if pattern } P_m \text{ can be included in segment } S_k \\ 0 & \text{otherwise} \end{cases} \quad (5)$$

Finally, a segmentation is as the set of individual segments $$S = \{S_1, \ldots, S_K\} \quad (6)$$

2.2. Effective Segmentations

Here we consider a segmentation strategy to be effective if it is able to discriminate between consumer segments with respect to the rate of enrollment. That is, a good strategy (on K segments) will identify those segments in the population that enroll with probabilities $q_k$, k=1, ..., K that are very different from (either smaller or greater than) the overall rate q observed in the entire population. For example, if the segmentation consists of K=2 groups A and B, it is perfectly effective if all consumers in A enroll, but no consumer in B enrolls (so $q_A=1$ and $q_B=0$). A perfectly ineffective segmentation is one where consumers in A enroll at the same rate as consumers in B (so $q_A=q_B$). Of course, one could always group consumers into two segments by having all those who have enrolled in efficiency programs be in one of the segments; however, the challenge is to identify patterns in the consumer characteristics X that lead to interpretable, intuitive definitions of segments that are also predictive of enrollment.

The effectiveness of each segment may be computed in a similar way to the effectiveness of a pattern as the (empirical) enrollment probability of consumers in that segment:

$$q(S) = \frac{\sum_{i \in S} 1\{y_i = 1\}}{|S|}. \quad (7)$$

A segment is thus a good proxy for enrollment if $|q_k - q| \gg 0$, where $$q = \frac{\sum_{i \in \Omega} 1\{y_i = 1\}}{N}$$

is the rate of enrollment in the overall population. The problem we want to solve is to allocate at least $\underline{\pi}$ and at most $\overline{\pi}$ patterns to each segment such that the resulting segments have desirable effectiveness properties, for example:
maximize the minimum effectiveness:

$$\max_{S_1, \ldots, S_K} \min_k q(S_k) \quad (8)$$

ensure an appropriate balance of effectiveness across segments:

$$\max \theta_1 q(S_1) + \ldots + \theta_K q(S_K) \quad (9)$$

with $\theta$ a given weights vector.
For this, define the decision variables $z_{mk}$ ($Z \in \mathbb{R}^{M \times K}$) such that $$z_{mk} = \begin{cases} 1 & \text{if pattern } P_m \text{ is included in segment } S_k \\ 0 & \text{otherwise} \end{cases} \quad (10)$$

As such, a segment k is defined as $$S_k = \cup_{m : z_{mk} = 1} P_m \quad (11)$$

Then the problem becomes to find the values of $z_{mk}$ such that one of the objectives (8-9) is maximized, and the following feasibility constraints ($F_0$) are satisfied:

Include patterns only in allowed segments $\quad z_{mk} \leq b_{mk}, \quad \forall m, k$ Limit number of patterns per segment $\quad \underline{\pi} \leq \sum_m z_{mk} \leq \overline{\pi} \quad \forall k$ A pattern can only belong to one segment $\quad \sum_k z_{mk} \leq 1, \quad \forall k$ Either select a pattern or not $\quad z_{mk} \in (0, 1), \quad \forall m, k \ (F_0)$ There may be many patterns that are feasible for a given segment, i.e., $|\{(P_m | b_{mk} > 0\}| > 1$; moreover patterns may overlap (that is, the sets of consumers they define are not disjoint, $\exists m, m', P_m \cup P_{m'} \neq \emptyset$). Then the segments in S may overlap as well, if they happen to contain patterns that overlap in the customers they describe. This imposes an additional complication to appropriately formulating an optimization problem that addresses (8-9) as well as satisfies the constraints (F0).

Were the patterns not overlapping, the segment effectiveness could be written as:

$$q_k = \frac{\sum_{i,m} y_i c_{im} z_{mk}}{\sum_{i,m} c_{im} z_{mk}} = \frac{y^T C z_k}{1^T C z_k} \quad (12)$$

$$= \frac{a^T z_k}{d^T z_k},$$

where $a \equiv C^T y$ and $d \equiv C^T 1$.

However, since pattern overlap can be substantial, the above expression over counts the consumers that fall into multiple patterns of the patterns $\mathcal{P}$. One simplification we adopt to address this issue is to relax the definition of the coverage matrix C, noting that a consumer who is covered by n different patterns may be considered as having a fractional coverage of 1/n on each pattern. This translates to a modified coverage matrix $\tilde{C}$:

$$\tilde{c}_{im} = \frac{c_{im}}{\sum_m c_{im}} \quad (13)$$

As such, the modified coverage matrix assigns a weight to each consumer i that indicates the fractional coverage of a single pattern (giving equal importance to each pattern). For simplicity we refer to this modified matrix still by C.

3. COMPUTING PREDICTIVE SEGMENTS

The design of an algorithm to compute predictive segmentations will be determined by the specific form that the objective function takes (all the constraints are simple linear ones). Here we focus on the situation where the objective is to allocate allowable patterns to segments such as to maximize the minimum effectiveness across the K segments—see Equation (8). This is a natural requirement for a program administrator that wishes to have guarantees about the minimum effectiveness of his targeted communications strategy.

3.1. Increasing the Minimum Effectiveness

The above formulation in Equation (12) makes use of K vectors $z_k$ that encode the decision variables for each segment. In order to express the objective and constraints in the more familiar affine form using a single decision variable vector we can employ the following notation:

$$v_k \equiv \left( 0^T 0^T \ldots \underbrace{v^T}_{k^{th} \text{position}} \ldots 0^T \right) \quad (14)$$

$$\tilde{1}_m \equiv \left( \left( 0 \ldots \underbrace{1}_{m^{th} \text{position}} \ldots 0 \right) \ldots \left( 0 \ldots \underbrace{1}_{m^{th} \text{position}} \ldots 0 \right) \right) \quad (15)$$

$$z \equiv (z_1^T z_2^T \ldots z_k^T \ldots z_K^T), \quad (16)$$

with z, $v_k$, and $\tilde{1}_m \in \mathbb{R}^{1 \times MK}$. Then the effectiveness can be expressed as $$q_k = \frac{a_k^T z}{d_k^T z}, \quad (17)$$

and the feasibility conditions in $F_0$ as:

$$z \leq vec(B)$$

$$1_k^T z \leq \bar{\pi}, \forall k$$

$$\tilde{1}_m^T z \leq 1, \forall m$$

$$z_{mk} \in \{0,1\} \quad (F)$$

In max-min objective case (8), the optimization tries to increase as much as possible the lower bound on the effectiveness across the segments. This results in a relatively homogeneous distribution of the $q_k$s. This situation may be desirable e.g., when action will be taken on each of the segments. In this case the optimization problem may be expressed as:

$$\max_z \min_{1 \leq k \leq K} \frac{a_k^T z}{d_k^T z} \quad (LFIP)$$

$$\text{subject to} \quad z \leq vec(B)$$

$$1_k^T z \leq \bar{\pi}, \forall k$$

$$1_k^T z \geq \underline{\pi}, \forall k$$

$$\tilde{1}_m^T z \leq 1, \forall m$$

$$z_{mk} \in \{0, 1\}$$

Problem (LFIP) is a generalized (max-min) linear-fractional integer program with linear constraints. This class of problems has been extensively studied in the literature (see e.g., Horst and Pardalos (1995), Feng et al. (2011), Schaible and Shi (2004) for reviews). Following Boyd and Vandenberghe (2004) we propose an equivalent formulation of (LFIP) as a linear-integer programming feasibility problem (LFIP-F):

$$\max_z \lambda \quad (LFIP-F)$$

$$\text{subject to} \quad (A - \lambda D)z \geq 0$$

$$z - vec(B) \leq 0$$

$$1_k^T z - \bar{\pi}, \leq 0, \forall k$$

$$\underline{\pi} - 1_k^T z \leq 0, \forall k$$

$$\tilde{1}_m^T z - 1 \leq 0, \forall m$$

$$z_{mk} \in \{0, 1\}$$

where A is a matrix with rows $a_k^T$ and D is a matrix with rows $d_k^T$, for $k=1, \ldots, K$. For a given value of $\lambda$ the above feasibility problem (LFIP-F) can be solved using standard mixed-integer programming packages. Although the initial customer characteristics data can be quite large (here $N \approx 1M$ consumers), the number of patterns is expected to be much smaller ($M \sim 1,000$), as is the number of segments (here $K=5$). Then a standard package can offer an excellent out-of-the-box performance. Then a maximum $\lambda^* = \max_z \lambda$ with a corresponding optimum z can be found efficiently using an iterative bisection Algorithm 1 (see Table 1, below) that solves a feasibility problem (LFIP-F) at each step. Starting with a large interval $[l_0, u_0]$ in which the optimum $\lambda^*$ is guaranteed to be (here [0, 1]), the algorithm successively narrows down the interval [l, u], at every step ensuring that $\lambda^* \in [u, b]$. This is outlined in Lemma 1 below which builds upon Patel et al. (2013).

Algorithm 1. Bisection Algorithm

---

Algorithm 1
Bisection algorithm for solving problem LFIP-F

Input: Interval [l, u] that contains the optimum $\lambda^*$; tolerance parameter $\epsilon$.
1: while $l < u$ and $[u - l] \geq \epsilon$ do
2: $\quad \lambda \leftarrow \frac{u+l}{2}$
3: $\quad z \leftarrow$ satisfies LFIP-F($\lambda$) ▷ Solve using a standard MIP solver such as GUROBI
4: $\quad$ if $\lambda$ feasible then
5: $\quad\quad u \leftarrow \lambda$
6: $\quad$ else
7: $\quad\quad l \leftarrow \lambda$
8: return z

---

Lemma 1. The output of algorithm 1 is an optimal $z^*$ corresponding to $\lambda^*$ the maximum value of $\lambda$ within a tolerance $\epsilon$, and within $\log_2(\epsilon_0/\epsilon)$ iterations.

To prove Lemma 1 we must show that the algorithm 1 will find a unique value $\lambda^*$ that is the maximum feasible value that $\lambda$ can take. For this, define the feasible set $$\Lambda = \{\lambda | \exists z \in \{0,1\}^{MK}, (A-\lambda D)z \geq 0, z \leq vec(B), 1_k^T z \leq \bar{\pi}, 1_k^T z \geq \underline{\pi}, \tilde{1}_m^T z \leq 1\} \quad (18)$$

With this notation we have $$\lambda^* = sup\{\lambda \in \Lambda\}$$

and the optimal pattern allocation to segment $z^*$ corresponds to $\lambda^*$. By definition the optimum $\lambda^*$ is the (upper) transition point between the feasible set $\Lambda$ and the unfeasible set $$\overline{\Lambda} \equiv \{\lambda | \lambda \notin \Lambda\}$$

so the following must hold for a tolerance parameter $\epsilon > 0$ (small):

$$\lambda \in \Lambda \implies \lambda - \epsilon \in \Lambda$$

$$\lambda \notin \Lambda \implies \lambda + \epsilon \notin \Lambda$$

To prove that Algorithm 1 will find the optimum $\lambda^*$ we need to show that it satisfies the above conditions. We focus solely on the term containing $\lambda$ in the analysis.

To prove the first condition, we take $$\lambda \in \Lambda$$

and we must prove that $$\lambda - \epsilon \in \Lambda$$

The fact that $\lambda \in \Lambda$ implies that $$\exists z_\lambda, s.t. (A - \lambda D)z_\lambda \geq 0$$

Then for $\lambda + \epsilon$ and the same $z_\lambda$, we have $$(A - (\lambda - \epsilon)D)z_\lambda = (A - \lambda D)z_\lambda + \epsilon D z_\lambda \geq 0.$$

The second term above is positive since $\epsilon > 0$ and both D and $z_\lambda$ have only non-zero entries.

To prove the second condition, fix a value $\lambda \notin \Lambda$ then we wish to show that $\lambda + \epsilon \notin \Lambda$ or $\epsilon > 0$. The fact that $\lambda \notin \Lambda$ implies that $\nexists z$, s.t. $(A-\lambda D)z \geq 0$ such we must have $(A-\lambda D)z < 0$, $\forall z$ for the given value of $\lambda$. Let $z_\lambda$ be the decision variable vector corresponding to $\lambda$ that produces the largest value of $(A-\lambda D)z$ and satisfies all the other conditions that define the feasibility set $\Lambda$ Then $$(A-\lambda D)z_\lambda \geq (A-\lambda D)z, \forall z \in \{0,1\}^{MK}$$

From the infeasibility of $\lambda$ we further have $(A-\lambda D)z_\lambda < 0$. Then for $\lambda + \in$ take a decision vector $z_{\lambda+\in}$ that produces the largest value of $(A-(\lambda+\in)D)z$·ut from before we have $(A-\lambda D)z_\lambda \geq (A-\lambda D)z_1 \forall z$, including $z_{\lambda+\in}$. Then we have for $z_{\lambda+\in}$:

$$(A-(\lambda+\in)D)z_{\lambda+e} = $$
$$(A-\lambda D)z_{\lambda+e} - \in Dz_{\lambda+e} \leq (A-\lambda D)z_\lambda - \in Dz_{\lambda+e} < 0.$$

Then since $(A-(\lambda+\in)D)z_{\lambda+\in}<0$'e conclude that $\lambda+\in \notin \Lambda$ As such, Algorithm 1 will always find a maximally feasible $\lambda^*$ corresponding to an optimum allocation vector $z^*$. Moreover, since with each step the algorithm halves the search interval [l,u], it takes at most $$\log_2\left(\frac{u_o - l_o}{u^o - l^o}\right) \leq \log_2\left(\frac{\in 0}{\in}\right)$$

steps to reach the completion condition of $|u-l|<\in\square$. As is readily apparent the optimization algorithm approximates the optimal solution such that the optimal solution lies in the search window $[l,u]<\in$, which becomes smaller with each iteration as described above.

3.2. Extracting Predictive Patterns from Data

Given a set of observations encoded as the feature matrix X and the binary response (enrollment) vector y, we wish to extract patterns P that are highly effective ($q \gg q_0$). For this we adopt the following approach:

1. Use an ensemble method such as Random Forests or AdaBoost Hastie et al. (2009) having classification trees as base learner to generate many decision trees of varying depths (here we generated trees of up to 5 levels). This step allows us to construct a list $P_0$ of initial patterns that we obtain by traversing the decision tree to each leaf. Depending on the level of the trees used as base classifier in the boosted ensemble, these rules can take varying forms of complexity, from single statements (trees of depth 1, or decision stumps) to conjunctions of multiple base rules.

2. Prune the patterns list $P_0$ to eliminate those rules that do not correspond to some set criteria of "quality". For this purpose we shall consider a pattern $P \in \mathcal{P}_0$ as "effective" if it meets both of these criteria:

Minimum support: $|P| > \eta$, i.e. the number of customers that match the pattern must be greater than $\eta$, such that $\eta+1$ is the minimum population matching each pattern. Here we used $\eta=500$.

Minimum effectiveness: $q(P) > \lambda q_0$. Here we used $\zeta=2$.

3. Further remove patterns that overlap more than v % (here v=70%, however values of v between 60 and 75% may also be used) with other patterns and have a lower effectiveness q. For example, for a pattern $P_1$ having matching customers $C_1$ and an effectiveness $q_1$ and a pattern $P_2$ having matching customers $C_2$ and an effectiveness $q_2$ that is less than $q_1$, if more than v % of the customers $C_2$ are included in $C_1$, then pattern $P_2$ will be pruned since it has lower effectiveness.

This procedure results in a pruned set of patterns $\mathcal{P}$

4. LITERATURE REVIEW

Customer targeting for energy programs has recently received attention from seemingly disparate literatures in engineering and computer science, operations management, and marketing. This work contributes to the larger discussion in those fields by providing a simple and transparent methodology that produces interpretable segments building on existing domain knowledge at operations and marketing departments at energy utilities. Engineering research on demand-side management has been motivated recently by the availability of detailed customer data, including fine-grained consumption readings and socio-demographic information. It has typically focused on a few main areas: i) using whole-home data (either from smart meters or from custom instrumentation) to describe consumption patterns of populations of users with the goal of informing programs such as tailored time-of-day pricing or smart thermostat controls Kwac et al. (2013), Albert and Rajagopal (2015); ii) collecting both whole-home and individual-appliance experimental data to reconstruct separate end uses from an aggregate signal Carrie Armel et al. (2013), Kolter and Jaakkola (2012); and iii) studying average effects of different external factors (in particular weather) on energy use Houde et al. (2012), Kavousian et al. (2013), Kavousian et al. (2015).

Most recent literature on energy analytics is concerned with characterizing consumption patterns (load profiling) in an extension of traditional demand-management practices at utilities that use aggregate demand profiles to inform programs. A segmentation strategy of consumers by the cost their consumption behavior poses to the grid has been proposed in Albert and Rajagopal (2014) as a way to target those groups of consumers who contribute most to the volatility in demand. A popular topic of study is the heterogeneity in typical daily load profiles (which typically entails clustering daily user consumption load shapes using off-the-shelf unsupervised algorithms such as K-Means) that can later be used for interventions such as differential pricing or incentives to reduce energy. This approach is taken in e.g., Flath et al. (2012), Rasanen and Kolehmainen (2009), Figueiredo et al. (2005), Smith et al. (2012), Tsekouras et al. (2007), Espinoza et al. (2005). Other variations on segmenting load profiles based on first learning generative models of consumption, then clustering the obtained models have been discussed in e.g., Albert and Rajagopal (2013), Alzate et al. (2009). This line of research is however largely descriptive in nature, as typically no clear use case is provided for the identified load patterns—and few programs at utilities currently exist that can incorporate such information.

On the other hand, the operations management and marketing literatures have seen a growing interest in applications to energy over the past several years. This may have been influenced by the fact that, at many utility companies, the department that concerns itself with allocating, enrolling, and targeting consumers with efficiency programs has traditionally been either Operations or Marketing.

5. EXPERIMENTAL SETUP 5.1. The Customer Characteristics Data

The data that we used in this application was obtained from a large energy company in the U.S. Northeast and was comprised of ~100 socio-demographic and building characteristics, as well as monthly energy consumption readings across two years for N=957,150 consumers. After standard data cleaning procedures, 43 variables of interest were selected that had at least 80% valid entries across the entire population. Out of those, 19 variables were categorical and 24 were numerical variables. Converting the categorical variables to binary dummy variables one obtains the final dataset of P=304 variables. Overall, 48,310 consumers, corresponding to a fraction $q_0=4.9\%$, had enrolled in any energy efficiency program in the two years prior to the data collection.

TABLE 1

Example Categorical-Valued Customer Characteristics

| Variable | Level | Percentage |
|---|---|---|
| GreenAware | Behavioral Greens | 52% |
| | Think Greens | 21% |
| | Potential Greens | 14% |
| | True Browns | 12% |
| Combined Homeowner | Homeowner | 80% |
| | Renter | 20% |
| Education | High School Diploma | 25% |
| | Bachelor Degree | 25% |
| | Graduate Degree | 23% |
| | Some College | 17% |
| | Less Than High School Diploma | 8% |
| Marital Status | Single | 54% |
| | Married | 46% |
| Home Heat Ind | Hot water | 75% |
| | Furnace | 20% |
| | Electric&Other | 4% |
| Spouse Gender Code | Female | 75% |
| | Male | 25% |
| Presence of Child Age 0-18 | Inferred No Children Present | 72% |
| | Confirmed Presence of Children | 27% |
| | No adult in household | 1% |

TABLE 2

Example Numerical-Valued Socio-Demographic and Building-Related Customer Characteristics

| | mean | std | min | 25% | 50% | 75% | max |
|---|---|---|---|---|---|---|---|
| Length of Residence | 12.3 | 11.9 | 0.0 | 3.0 | 8.0 | 19.0 | 64.0 |
| Number of Adults in Household | 2.2 | 1.4 | 0.0 | 1.0 | 2.0 | 3.0 | 8.0 |
| Birth Year | 1957 | 13.0 | 1880 | 1951 | 1960 | 1963 | 1995 |
| Year Built | 1937 | 38.0 | 1900 | 1900 | 1925 | 1973 | 2014 |
| Home Total Rooms | 6.8 | 2.7 | 1.0 | 6.0 | 6.0 | 7.0 | 41.0 |
| kWh annual | 8661.6 | 8659.4 | 0.0 | 3952.5 | 6848.6 | 11160.0 | 1103400.0 |

Table 1 describes several categorical variables of interest. A large majority of consumers (80%) own their homes, and only ~16% rent. The education levels reflect society at large, with a quarter of consumers having each college degrees and graduate degrees, while half of the consumers have a high school diploma or less. The "Green Aware" variable summarizes the result of a third-party analysis that takes into account factors such as magazine subscriptions, community involvement, political leaning, affiliations to different organizations etc. to result in an inferred level of interest in environmental matters.

Table 2 summarizes several more numerical variables of interest. The average birth year is 1957, which suggests a baby-boomer demographic. The average family in the sample lives in a large home (6 rooms) with a tenure of more than 12 years.

5.2. Predictive Patterns Extracted from Data

Figure 4:
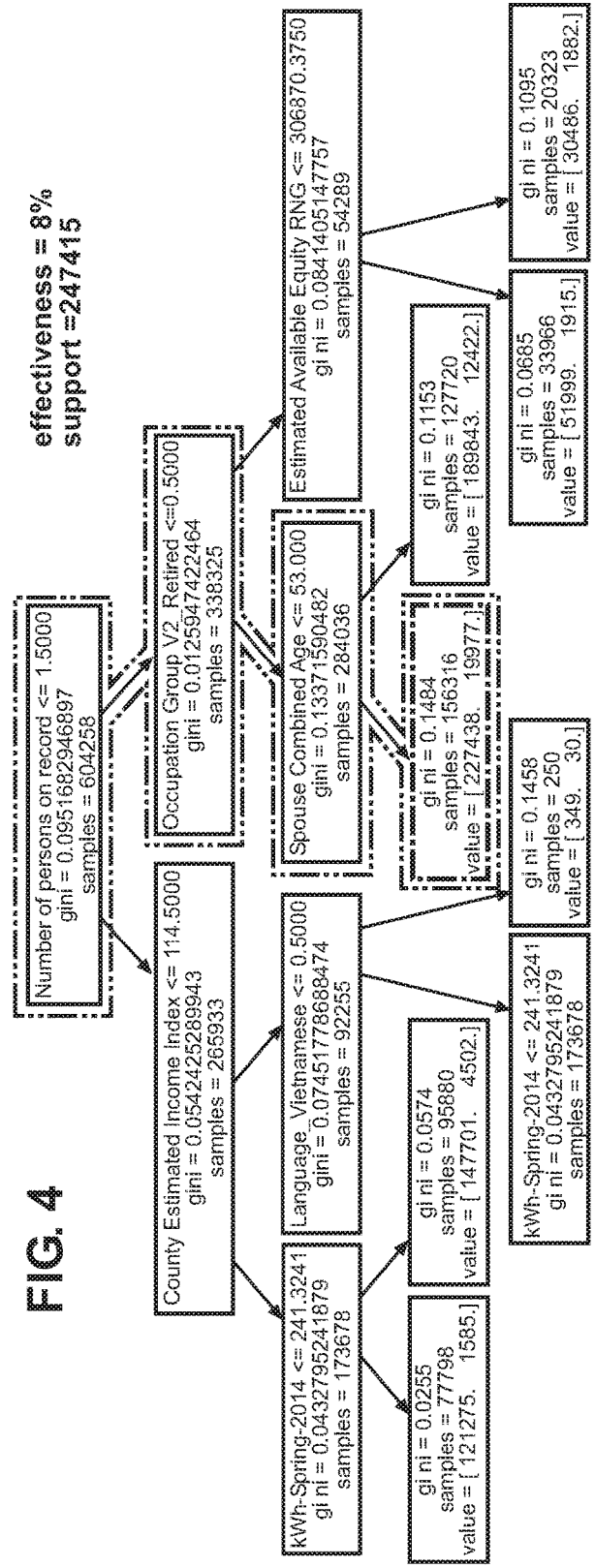
FIG. 4 is a diagram illustrating a decision tree extracted from customer data.

Predictive rules were extracted from the data as described above in Section 3. After pruning, the list of predictive patterns (whose effectiveness was at least $2\times q_0 \approx 0.10$, and that had a support of at least $\eta=500$) contained $M_0=2,965$ patterns of up to 5 base rules each (1852 patterns with 5 base rules, 963 patterns with 4 base rules, 143 patterns with 3 base rules, and 7 patterns with 2 base rules). FIG. 4 illustrates an example decision tree of height 3 extracted from the data. The highlighted pattern is a path in the decision tree starting from the root for which the effectiveness (proportion of positive samples) is 8%. FIG. 5 illustrates the distribution of pattern effectiveness q(R) for pattern of different complexities (2-5 base rules) for the $M_0=2,965$ patterns extracted from the data. As expected, the distribution exhibits an exponential behavior, with many patterns of lower effectiveness, and fewer highly-effective patterns.

Figure 6:
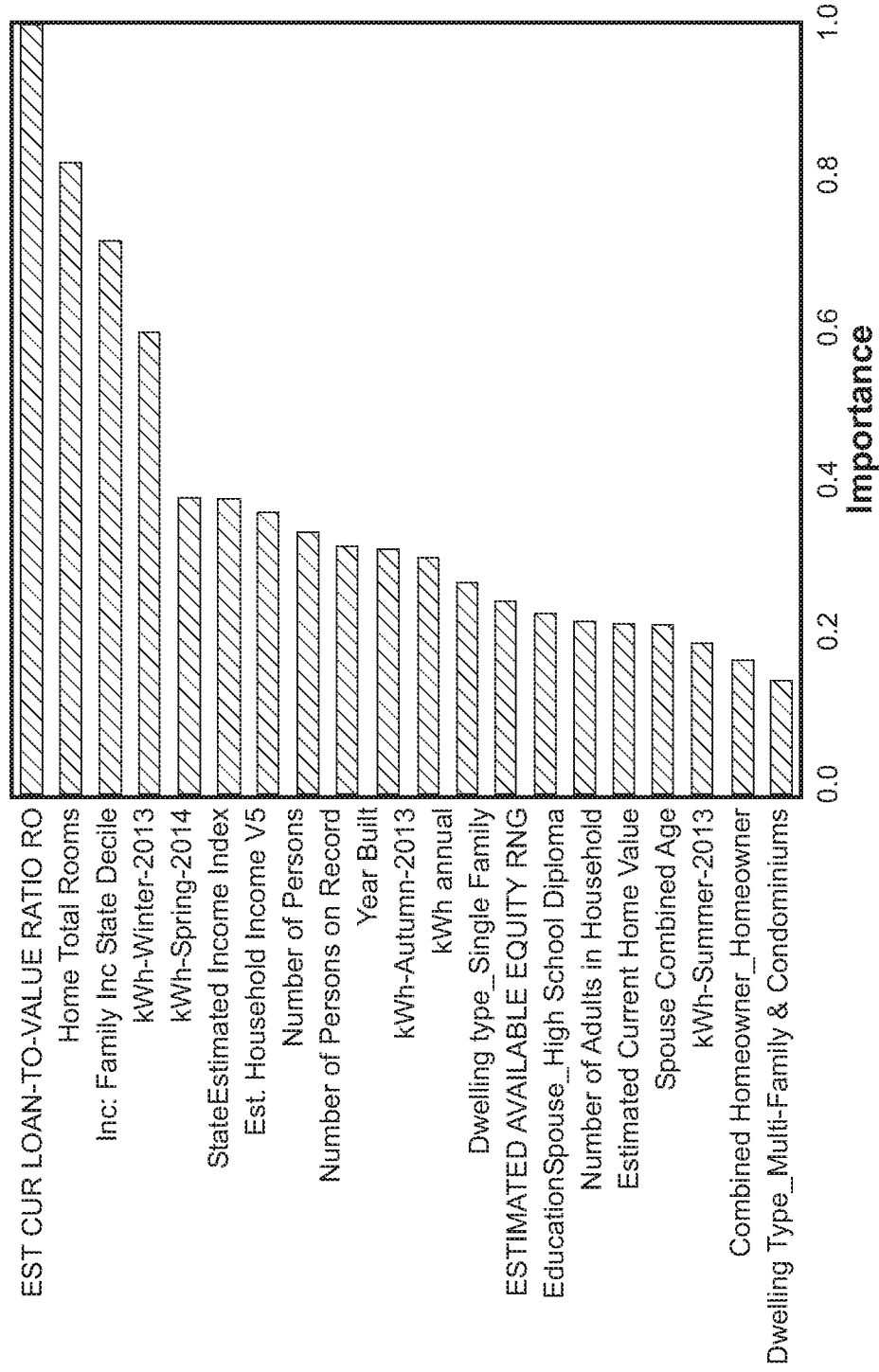
FIG. 6 is a graph showing predictive variables for explaining enrollment of energy customers.

The top 20 most important variables for predicting enrollment are listed in FIG. 6. These include the amount of ownership on the house (loan to value ratio, available equity), the size of the house and of the family living there, and measures of family income, among others. This suggests that enrollment depends on the perception of financial commitment and ability as pertains to improvements to the house. The present analysis only considered enrollment into any energy efficiency programs; it is likely that analyzing specific programs geared towards more specific types of consumers will yield more refined distinctions in the important variables (such as rebates for insulation as opposed to efficient appliances).

5.3. Associating Patterns to Segments

Segments were defined using results of prior behavioral research and extensive interaction with the energy utility that provided the data. The utility wished to identify consumers falling into a small number of segments that it had already defined based on its own internal expertise and research, as well as independent third-party behavioral and marketing studies such as Frankel et al. (2013). As described in Section 2 above, the purpose of the segments was twofold: i) crafting a small number of marketing communications such as standardized emails with appropriate information and framing for each segment, and ii) identifying consumers corresponding to each segment that were likely to enroll in an energy efficiency program.

Based on this prior art, the utility believed that consumers fall into K=5 segments: "Green Advocates", "High Consumption", "Home Improvers", "Cost Conscious," and "Cultural Drivers." The segment meaning that encode this hypothesis are summarized in Table 3. Given these segment definitions, potential patterns P from $P_0$ were associated to the different segments by ensuring that each pattern P was δ-consistent (see Section 2) with the hypothesis about the meaning of the respective segment. That is, for a given segment S those rules $P \in \mathcal{P}_0$ were found that contained at least δ base rules $P_j \in R$ that matched both in the variable j and in the direction (either greater than or smaller than a threshold learned from the data). The resulting set of patterns P contained M=219 patterns. Not all consumers were covered by the reduced set of patterns $\mathcal{P}$ with $N = |\cup_{P \in \mathcal{P}} P|$ 614,830 (64% of the original sample), but 89% of the enrolled consumers were included in the reduced set.

TABLE 3

Segment Definition and Association Patterns Extracted from Data.

| Segment | Meaning | # Variables | # Patterns | q | Coverage |
|---|---|---|---|---|---|
| High Consumption | Large annual or monthly kWh True Brown | 7 | 79 | 8.2% | 416018 |
| Cost Conscious | Small home Low income Non-professional Home ownership is relevant Marital status is relevant | 20 | 24 | 8.3% | 431020 |
| Home Improver | Home owner Large financial stake in home Long-term occupant | 8 | 5 | 10.2% | 81340 |
| Green Advocate | Educated (college or above) High income Professional occupation | 17 | 50 | 8.3% | 373834 |
| Cultural Drivers | Ethnicity is relevant Language is relevant Religion is relevant | 90 | 62 | 9.1% | 308146 |

Figure 7:
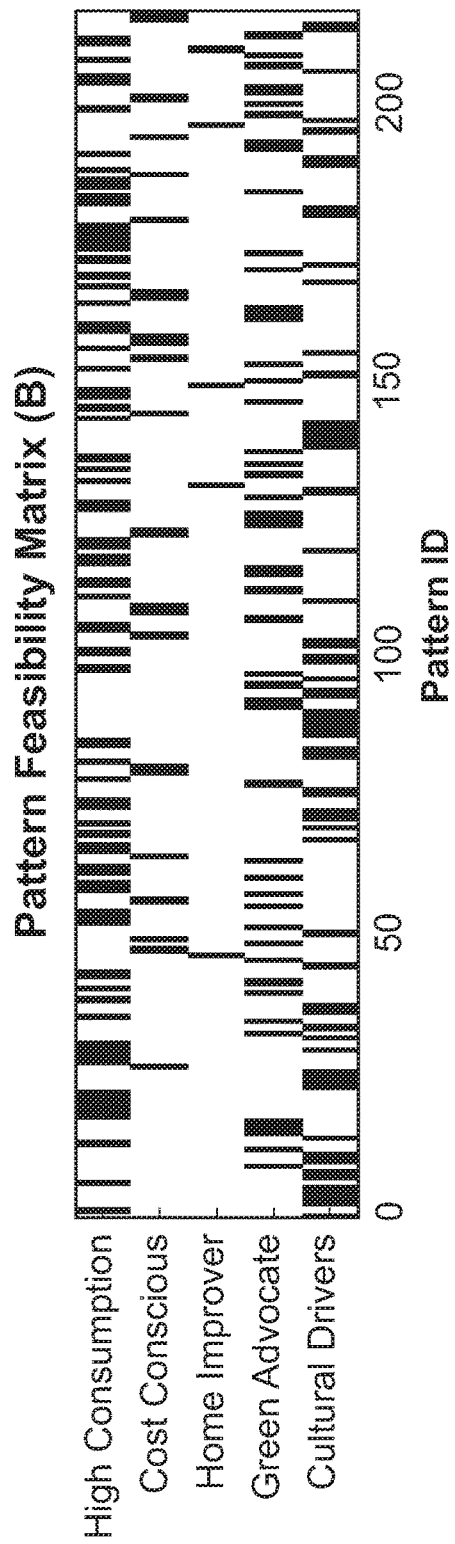
FIG. 7 is a feasibility matrix for patterns assigned to segments of customers.
Figure 8:
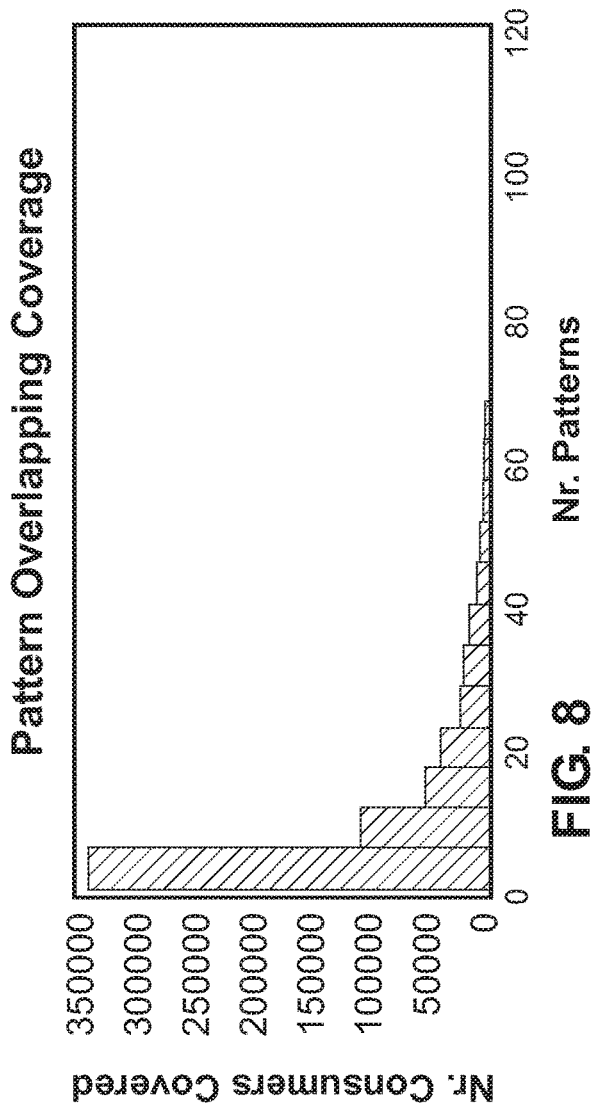
FIG. 8 is a plot showing a distribution of overlap among patterns.

The number of patterns obtained for each segment, as well as their coverage (number of consumers in the pattern) are also listed in Table 3. While the number of patterns is smaller than the initial ~3000, it is still a non-trivial task to select a small enough number that approaches maximum effectiveness. The association matrix B that encodes the pattern-to-segment assignment feasibility is illustrated in FIG. 7. Some patterns may belong to multiple segments, as illustrated in FIG. 8. There, the distribution of the number of patterns that cover users is plotted. Most users are covered by a small number of patterns; however, there are a small number of users that simultaneously fall into more than 50 patterns.

Two examples of rules extracted from the data and assigned to segments "High Consumption" and "Cost Conscious" are displayed in FIG. 9. The patterns assigned to "High Consumption" contain at least $\delta=1$ base rules that involves a condition that consumption be greater than a given threshold value.

6. RESULTS

Figure 11:
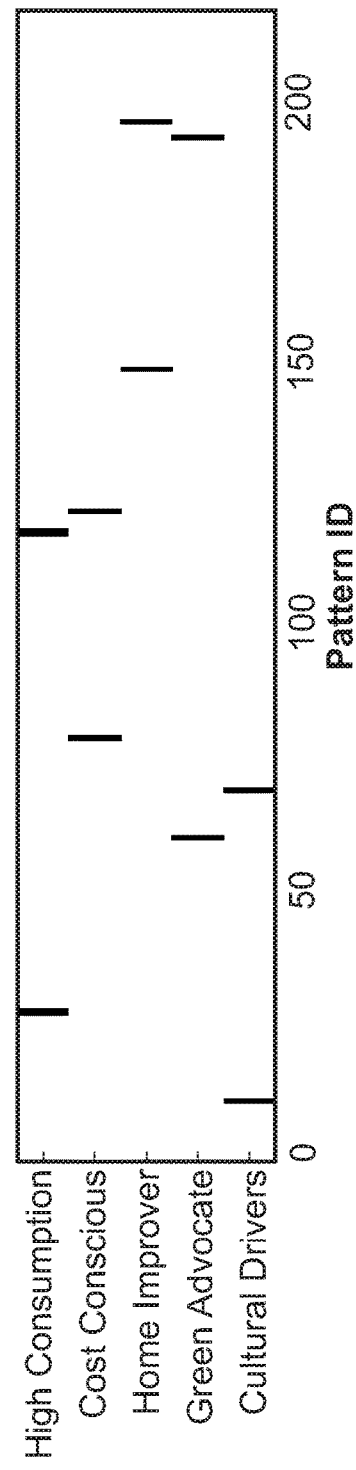
FIG. 11 illustrates a pattern-to-segment allocation matrix.

Algorithm 1 was used to obtain an approximately optimal feasible allocation of patterns to segments Z in the case where ($\overline{\pi}=5$, $\underline{\pi}=1$). The algorithm narrows the search region from [0, 1] (of width $\in_0$) in until convergence in 14 iterations, when $|u-l| < \in = 10^{-14}$. Accordingly, the allocation of patterns to segments Z approximates the optimal solution within $\in = 10^{-14}$. The bisection search process is illustrated in FIG. 10, which shows finding a maximum lower bound $\lambda$ on segment effectiveness by iteratively solving a feasibility problem (LFIP-F) with $\overline{\pi}=5$ and $\underline{\pi}=1$. The resulting optimal allocation matrix Z for $\overline{\pi}=5$ and $\underline{\pi}=1$ is displayed in FIG. 11. There, the horizontal axis orders patterns by an arbitrary ID number in the same format as that used in FIG. 10 to represent the allowable assignment matrix B. The algorithm has selected a small number of patterns with the best effectiveness properties and that satisfy the constraints in (F$_0$).

The optimal solution contains 10 patterns spread out across the 5 segments. Table 4 summarizes the effectiveness and size of the resulting segments. The final effectiveness numbers are all greater than $2 \times q_0$, with consumers assigned to one segment ("Cultural Drivers") enrolling at almost three times the rate in the overall population.

TABLE 4

Effectiveness vs. Size of Segments

| | High Consumption | Cost Conscious | Home Improver | Green Advocate | Cultural Drivers |
|---|---|---|---|---|---|
| q(S$_u$) | 0.101 | 0.120 | 0.123 | 0.104 | 0.145 |
| \|S$_u$\| | 119520 | 113310 | 63768 | 141304 | 7881 |

Figure 12:
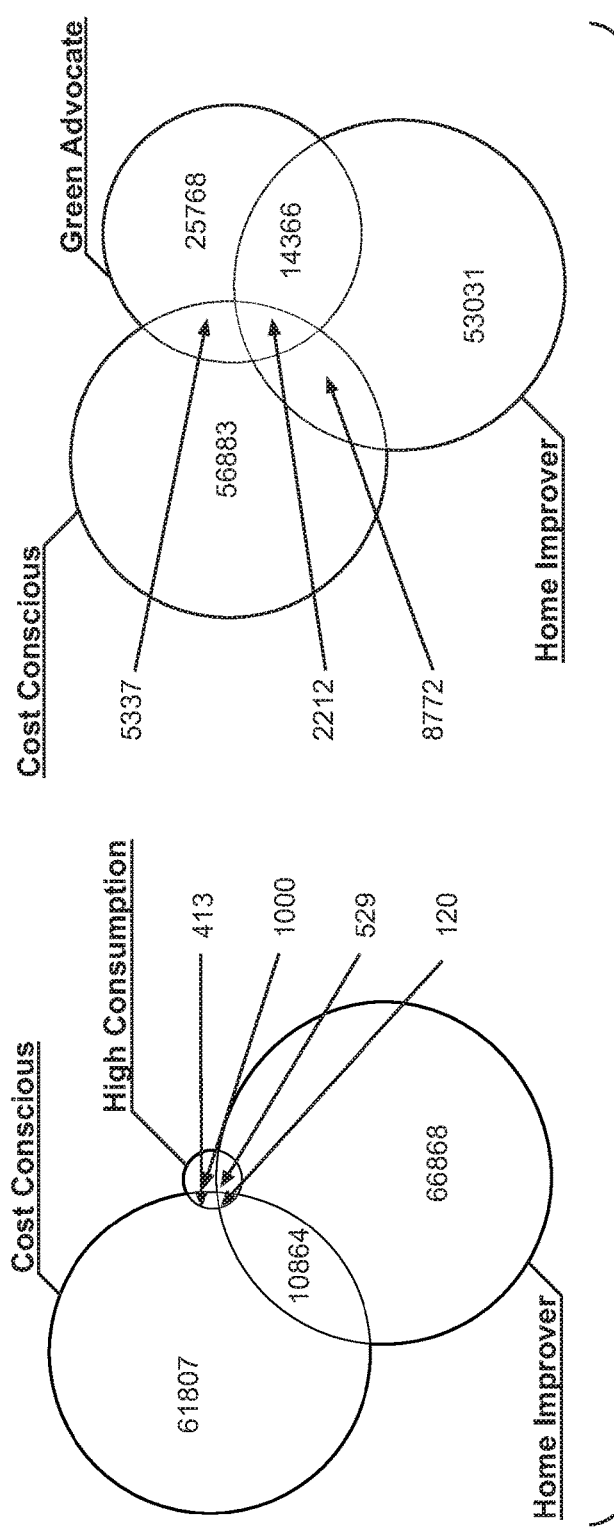
FIG. 12 illustrates overlap of segments.
Figure 13:
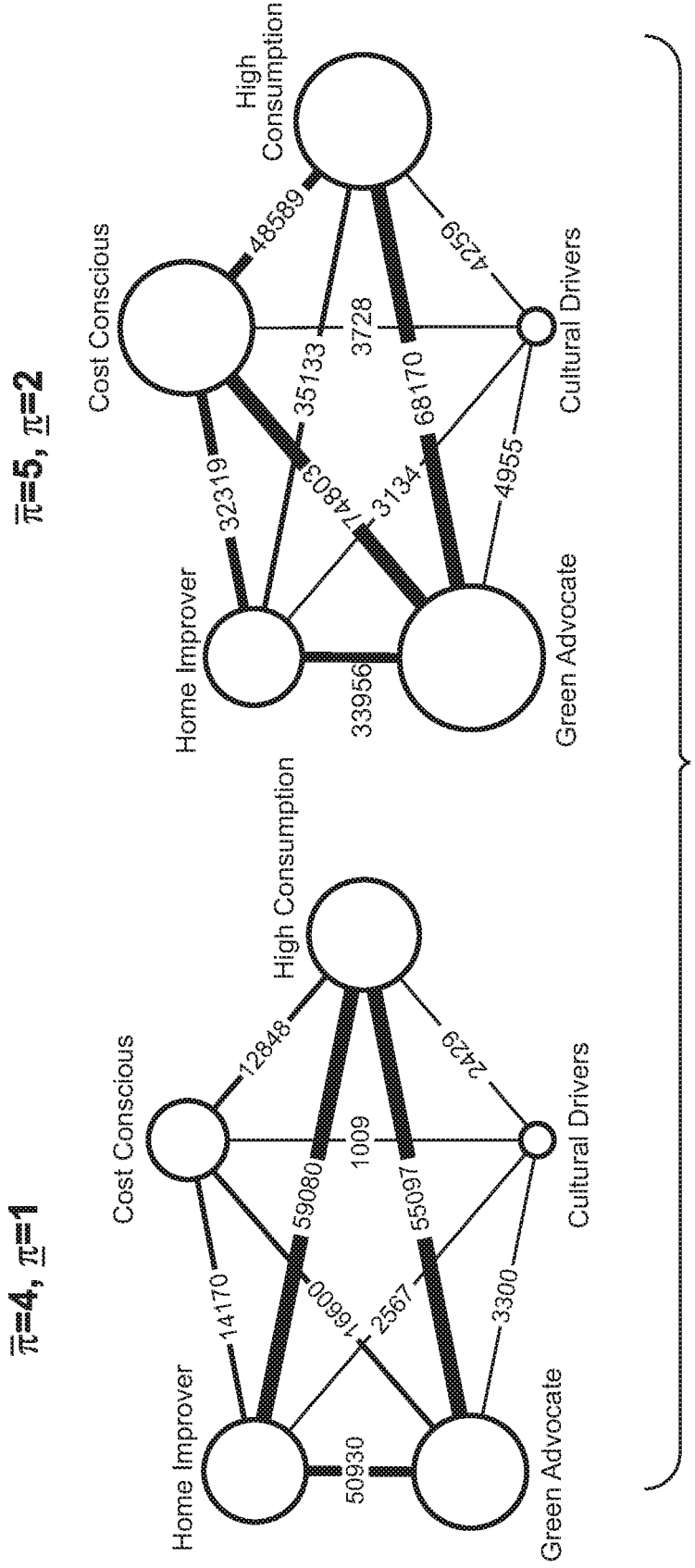
FIG. 13 is another diagram illustrating segment overlap.

FIG. 12 shows examples of the overlap between segments. This overlap is induced because the patterns themselves that make up the segments may and do overlap in the customers they cover. Segment overlap is however a natural concept in reality, as consumers may have certain traits that may ascribe them to one segment (such as "Cost Conscious"), while other traits are shared with consumers in a different segment (such as "Home Improver"). The segmentation technique transparently accounts for this situation. A more exhaustive view of segment overlap is presented in FIG. 13 as a network plot. There, each segment is represented as a node of a size proportional to the number of customers in that segment; the weight of the links between the segments represents the pairwise overlap of the segments. As the constraints are changed from ($\overline{\pi}=4$, $\underline{\pi}=1$) (left panel) to ($\overline{\pi}=5$, $\underline{\pi}=2$) (right panel), the structure of the segmentation changes as more patterns are used to construct some of the segments.

Note that "segments" are constructs that are defined by the program administrator so as to aid with creating and managing communications that differentiate among consumers to some extent while keeping operational cost and complexity low. They uncover some heterogeneity, but at the same time do not allow for fully tailoring an intervention down to the individual. Imposing that every consumer belong to one segment only imposes unrealistic assumptions, which this approach circumvents.

FIG. 14 includes a list of the patterns defining the segments that correspond to the optimal pattern allocation for ($\overline{\pi}=5$, $\underline{\pi}=2$). The hypotheses in Table 3 about the meaning of each segment are enriched with specific information such as thresholds t$_j$ (defining precisely what "high" and "low" mean) and additional base rules. For example, one type of "Home Improvers" who enroll in energy efficiency programs at a high rate are South Asians who earn more than $75,000 a year, and who own an equity on their house of more than $306,870. Similarly, one type of "Green Advocates" are families that earn more than $75,000 a year, making at least two and a half times the average income level for their state, who have children, and don't live in multi-family accommodations. The patterns in each segment may then be used to design marketing communications specific to that segment, as to include elements which consumers in that segment are seen to be responsive. Moreover, the specificity of the patterns (in terms of thresholds learned from data) allows to target those consumers that are most likely to enroll.

Figure 15:
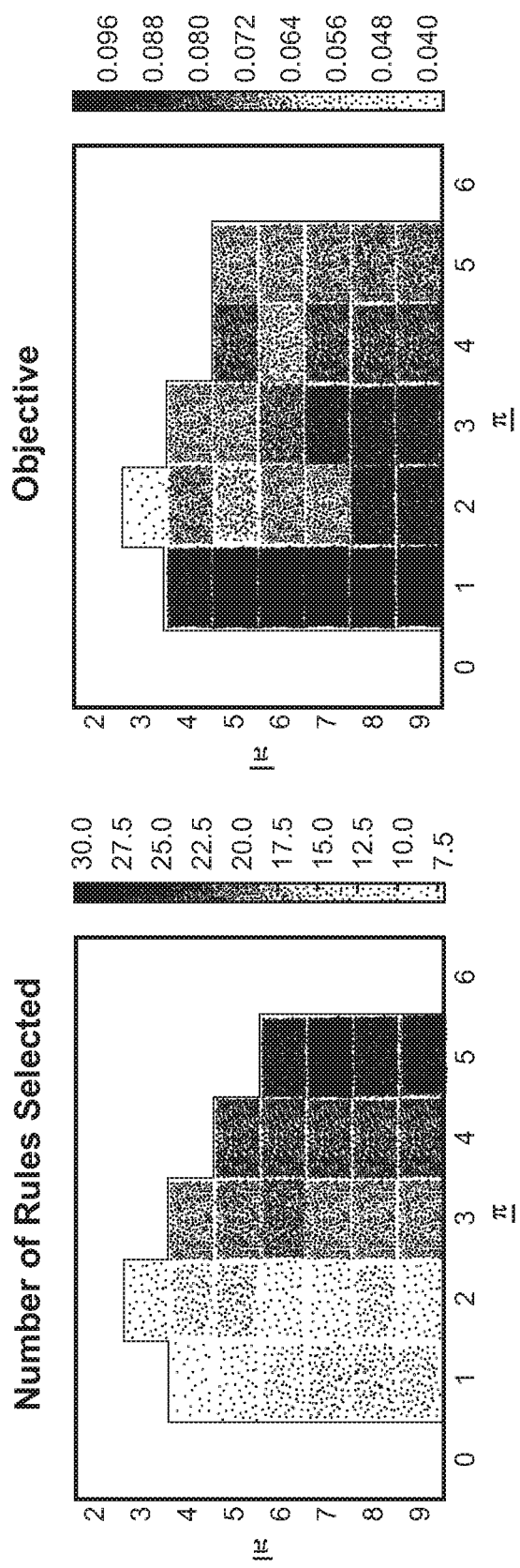
FIG. 15 are plots showing sensitivity analysis of the segmentation algorithm with respect to $\bar{\pi}$ and $\pi$.

From the discussion above it is clearly apparent that the structure of the segmentation obtained depends strongly on the nature of the constraints, specifically on the values of $\bar{\pi}$ and $\underline{\pi}$. To study this dependence, Algorithm 1 was run for a grid $(\bar{\pi}, \underline{\pi})$ where $1 \leq \bar{\pi} \leq 9$ and $1 \leq \underline{\pi} \leq \bar{\pi}$. The optimum value of the objective $\lambda^*\bar{\pi}, \underline{\pi})$ and the number of patterns selected for the segmentation are illustrated in FIG. 15. The best results are obtained when $\underline{\pi}=1$ (so the algorithm does not force more patterns into segments than necessary). Good results ($\lambda^* \approx 12\%$) are shown to be obtained for moderate to large values of $\bar{\pi}$(4-8) and low values of $\underline{\pi}$(1-3). These maps thus offer a guideline of how to trade off model complexity and segmentation effectiveness.

Figure 16:
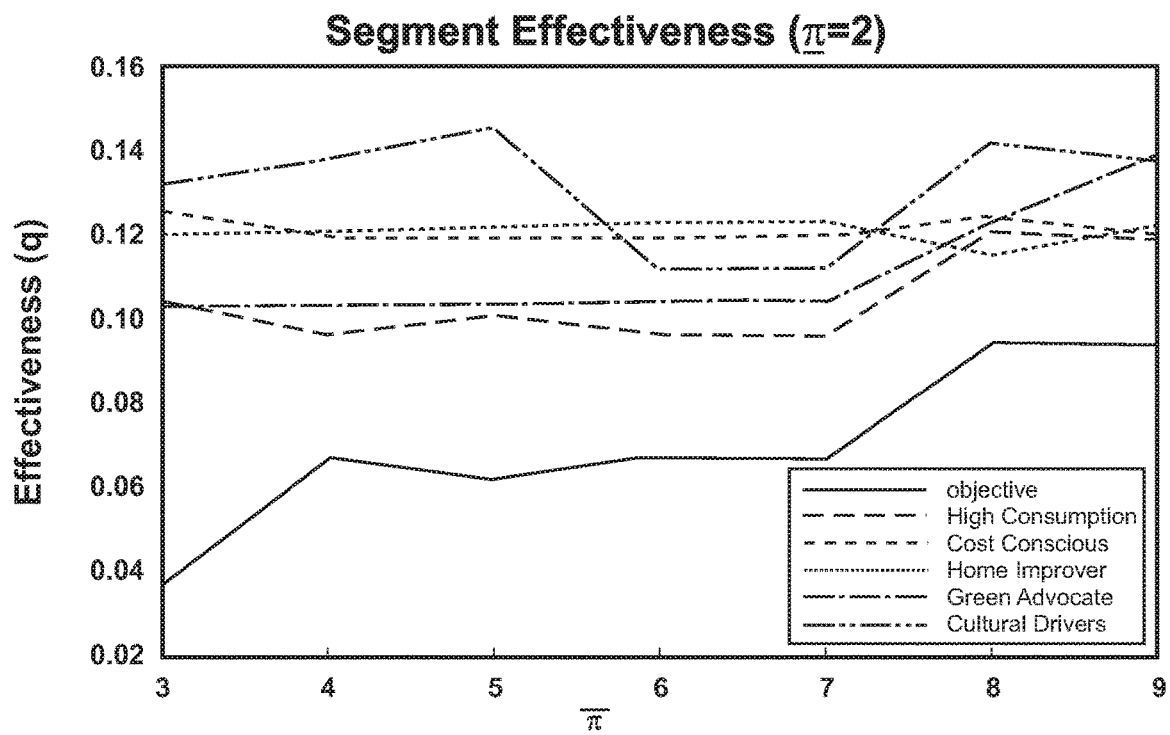
FIG. 16 is a plot of segment effectiveness with respect to $\bar{\pi}$.
Figure 17:
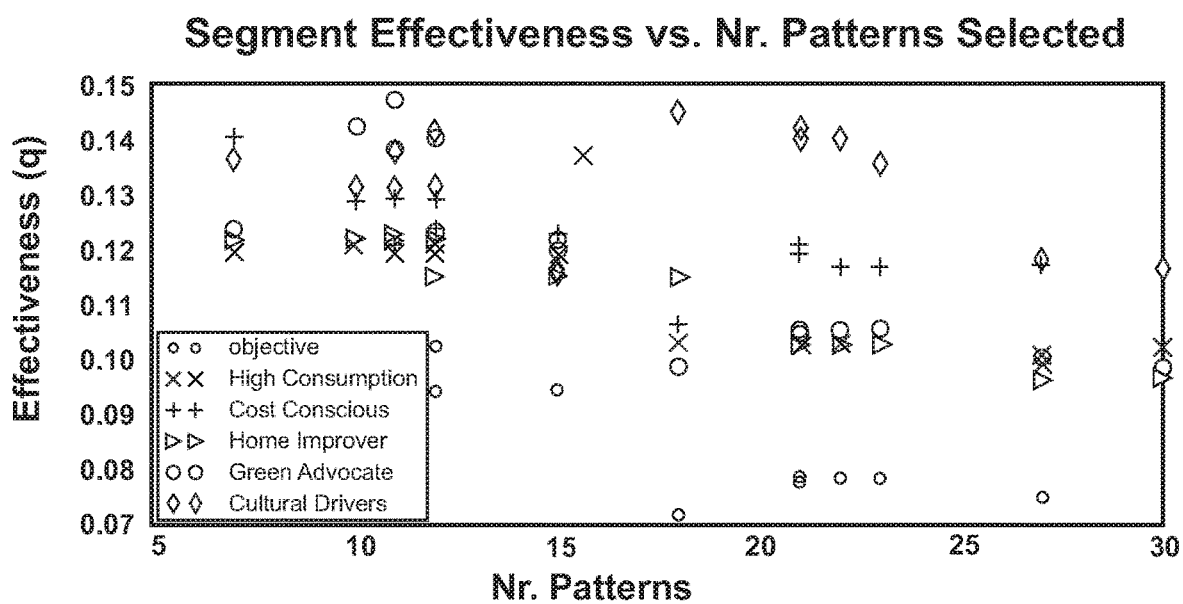
FIG. 17 is a scatter plot of segment effectiveness as a function of segmentation complexity.

For a given value of $\underline{\pi}$, the variation of the objective $\lambda^*$ and the individual segment effectiveness values $q_k$, $k=1, \ldots, K$, with $\bar{\pi}$ was observed. Then this can serve as tuning parameter for the complexity of the resulting segmentation, which can be designed to accommodate desired effectiveness values of individual segments of interest. This is illustrated in FIG. 16 for a value of $\underline{\pi}=2$. For example, if the emphasis falls on "Cultural Drivers," a segmentation with $\bar{\pi} \in E$ {3, 4, 5} is preferred. Note that for all values of k, $q_k$ is distinctly greater than $\lambda^*$ Lastly, the dependence of individual segment effectiveness on the segmentation complexity (total number of patterns selected across segments) is illustrated in FIG. 17. This highlights the best possible effectiveness values that can be achieved for a fixed, given value of segmentation complexity. For example, if the efficiency program manager wishes to select a total number of patterns between 20 and 25, he can expect the optimum effectiveness of the "Cultural Drivers" segment to always be greater than that of the "Cost Conscious" segment. For that range of $\bar{\pi}$, the "Home Improvers," "Green Advocates" and "Cultural Drivers" all have an effectiveness value around 11%.

7. CONCLUSIONS

This application introduced a method for programmatically constructing interpretable, predictive segmentations of energy consumers. The predictive segmentation problem was formulated based on first extracting predictive patterns (conjunctions) from data, then optimally allocating the patterns to segments. The segments were defined using prior behavioral and marketing research at an energy utility. The optimal allocation was formulated as solving a generalized (max-min) linear-fractional integer program with linear constraints. To solve this program, an efficient bisection algorithm was used. The method was used to identify optimally predictive segments in a population of ~1M electricity consumers of a large U.S. energy utility. Optimal sub-sets of consumers were identified whose characteristics aligned with the general hypotheses of the utility about the types of consumers it services, and who enrolled at least at double the enrollment rate of ~5% in the overall population. These segments represent consumers that the utility may craft appropriate messages to, and for which are more effective and economical to target.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope The following references are incorporated herein by reference in their entirety:

Albert, A., R. Rajagopal. 2013. Smart meter driven segmentation: What your consumption says about you. *Power Systems, IEEE Transactions on* 28(4) 4019-4030. doi: 10.1109/TPWRS.2013.2266122.

Albert, A., R. Rajagopal. 2014. Cost-of-service segmentation of energy consumers. *Power Systems, IEEE Transactions on* 29(6) 2795-2803. doi:10.1109/TPWRS.2014.2312721.

Albert, A., R. Rajagopal. 2015. Thermal profiling of residential energy use. *Power Systems, IEEE Transactions on* 30(2) 602-611. doi:10.1109/TPWRS.2014.2329485.

Alzate, Carlos, Marcelo Espinoza, Bart Moor, Johan A. Suykens. 2009. Identifying customer profiles in power load time series using spectral clustering. *Proceedings of the 19th International Conference on Artificial Neural Networks: Part II. ICANN '09*, Springer-Verlag, Berlin, Heidelberg, 315-324. doi: 10.1007/978-3-642-04277-5 32. URL http://dx.doi.org/10.1007/978-3-642-04277-5_32.

Association, Information Resources Management. 2014. *Marketing and Consumer Behavior: Concepts, Methodologies, Tools, and Applications*. IGI Global. URL https://books.google.com/books?id=RVwFogEACAAJ.

Bhatnagar, Amit, Sanjoy Ghose. 2004. A latent class segmentation analysis of e-shoppers. *Journal of Business Research* 57(7) 758-767. URL http://EconPapers.repec.org/RePEc:eee:jbrese:v:57:y:2004:i:7:p:758-767.

Boyd, Stephen, Lieven Vandenberghe. 2004. *Convex Optimization*. Cambridge University Press, New York, N.Y., USA.

Carrie Armel, K., Abhay Gupta, Gireesh Shrimali, Adrian Albert. 2013. Is disaggregation the holy grail of energy efficiency? the case of electricity. *Energy Policy* 52(C) 213-234. URL http://EconPapers.repec.org/RePEc:eee:enepol:v:52:y:2013:i:c:p:213-234.

Espinoza, M, C Joye, R Belmans, B DeMoor. 2005. Short-term load forecasting, profile identification, and customer segmentation: A methodology based on periodic time series. *IEEE Transactions on Power Systems* 20(3) 1622-1630. URL http://ieeexplore.ieee.org/lpdocs/epic03/wrapper.htm?arnumber=1490617.

Feng, Qigao, Hongwei Jiao, Hanping Mao, Yongqiang Chen. 2011. A Deterministic Algorithm for Minmax and Max-min Linear Fractional Programming Problems 4 134-141. doi:10.1080/18756891.2011.9727770.

Figueiredo, V., F. Rodrigues, Z. Vale, J. B. Gouveia. 2005. An electric energy consumer characterization framework based on data mining techniques. *Power Systems, IEEE Transactions on* 20(2). doi: 10.1109/TPWRS.2005.846234.

Flath, Christoph, David Nicolay, Tobias Conte, Clemens van Dinther, Lilia Filipova-Neumann. 2012. Cluster analysis of smart metering data—an implementation in practice. *Business & Information Systems Engineering* 4(1).

Frankel, David, Humayun Tai, Stefan Heck. 2013. Using a consumer-segmentation approach to make energy efficiency gains in the residential market. *McKinsey and Co. Research Study*.

Hastie, T., R. Tibshirani, J. Friedman. 2009. *The Elements of Statistical Learning: Data Mining, Inference, and Prediction, Second Edition*. Springer Series in Statistics, Springer. URL https://books.google.com/books?id=tVIjmNS3Ob8C.

Horst, Reiner, Panos M. Pardalos, eds. 1995. *Handbook of global optimization*. Nonconvex optimization and its applications, Kluwer Academic Publishers, Dordrecht, Boston. URL http://opac.inria.fr/record=b1088635.

Houde, Sebastien, Annika Todd, Anant Sudarshan, June Flora, K. Carrie Armel. 2012. Real-time feedback and electricity consumption: a field experiment assessing the potential for savings and persistence. *Energy Policy* doi: 10.1109/TCE.2011.5735484.

Kavousian, Amir, Ram Rajagopal, Martin Fischer. 2013. Determinants of residential electricity consumption: Using smart meter data to examine the effect of climate, building characteristics, appliance stock, and occupants' behavior. *Energy* 55 184-194.

Kavousian, Amir, Ram Rajagopal, Martin Fischer. 2015. Ranking appliance energy efficiency in households: Utilizing smart meter data and energy efficiency frontiers to estimate and identify the determinants of appliance energy efficiency in residential buildings. *Energy and Buildings* 99 220-230.

Kolter, J. Zico, Tommi Jaakkola. 2012. Approximate inference in additive factorial hmms with application to energy disaggregation. Journal of Machine Learning Research—Proceedings Track 22 1472-1482.

Kwac, Jungsuk, June Flora, Ram Rajagopal. 2013. Household energy consumption lifestyle segmentation using hourly data. *IEEE Transactions on the Smart Grid*.

Li, Zhao, Fang Yang. 2015. Governing millions meters data. *Power Energy Society General Meeting, 2015 IEEE*. 1-5. doi: 10.1109/PESGM.2015.7286131.

Liu, Xiufeng, Per Sieverts Nielsen. 2015. Streamlining smart meter data analytics. *Proceedings of the 10$^{th}$ Conference on Sustainable Development of Energy, Water and Environment Systems*.

Patel, S., R. Sevlian, B. Zhang, R. Rajagopal. 2013. Pricing Residential Electricity Based on Individual Consumption Behaviors. *ArXiv e-prints*.

Rasanen, Teemu, Mikko Kolehmainen. 2009. Feature-based clustering for electricity use time series data. Mikko Kolehmainen, Pekka Toivanen, Bartlomiej Beliczynski, eds., *Adaptive and Natural Computing Algorithms, Lecture Notes in Computer Science*, vol. 5495. Springer Berlin/Heidelberg, 401-412.

Schaible, Siegfried, Jianming Shi. 2004. Recent developments in fractional programming: Single ratio and max-min case.

Smith, Brian Arthur, Jeffrey Wong, Ram Rajagopal. 2012. A simple way to use interval data to segment residential customers for energy efficiency and demand response program targeting. *ACEEE Summer Study on Energy Eficiency in Buildings*.

Tsekouras, G., N. Hatziargyriou, E. Dialynas. 2007. Two-stage pattern recognition of load curves for classification of electricity customers. *IEEE Transactions on Power Systems* 22 1120-1128.

Yan, Jun, Ning Liu, Gang Wang, Wen Zhang, Yun Jiang, Zheng Chen. 2009. How much can behavioral targeting help online advertising? *Proceedings of the 18th international conference on World wide web*. ACM, 261-270.

The invention claimed is:

1. A computer-implemented method for customer segmentation, comprising:
    accessing a customer record for each of a plurality of customers, wherein each customer record comprises a plurality of types of data, and wherein the plurality of types of data comprise at least resource consumption data;
    determining, for each of the plurality of customers and based on the customer records, a customer adoption status;
    generating an initial pattern set by traversing a decision tree, wherein each node of the decision tree defines a threshold data value or a range of data values for one of the plurality of types of data in the customer records;
    pruning the initial pattern set by removing patterns that are either ineffective or duplicative;
    assigning remaining patterns that have not been removed by the pruning to segments using an algorithm that iteratively maximizes a minimum effectiveness of the segments, wherein the effectiveness of a segment is a measure of a number of customer records that match the patterns assigned to the segment that have a positive adoption status, and wherein a customer record that matches multiple of the remaining patterns is assigned a weight that indicates a fractional coverage of each of the multiple patterns; and
    using the segments for targeted customer engagement, by selectively formulating and transmitting advertisements to only the customers matching the patterns of a corresponding segment, in order to increase marketing effectiveness.

2. The method of claim 1, wherein each pattern defines a subset of customer records that match the pattern.

3. The method of claim 1, wherein removing a pattern that is duplicative comprises removing a pattern that defines a subset of customer records that has a threshold level of overlap with a subset of customer records defined by an other pattern.

4. The method of claim 3, wherein the threshold level of overlap is between about 60 percent and about 75 percent.

5. The method of claim 3, wherein the removed pattern has a lower effectiveness than the other pattern.

6. The method of claim 1, wherein the effectiveness of a pattern is an empirical probability that customer records that match the pattern have a positive adoption status.

7. The method of claim 1, further comprising:
    removing patterns that do not have a threshold number of customer records that match the pattern.

8. The method of claim 7, wherein the threshold number of customer records is between about 100 and about 1000.

9. The method of claim 1, wherein removing patterns that are ineffective comprises removing patterns that do not have a threshold number of customer records (i) that match the pattern and (ii) have a positive adoption status.

10. The method of claim 1, wherein each pattern comprises a conjunction of two or more rules.

11. The method of claim 10, wherein the customer records that match each pattern satisfy the two or more rules of the pattern.

12. The method of claim 1, wherein the plurality of types of data further comprise socio-demographic data describing each of the plurality of customers.

13. The method of claim 12, wherein the sociodemographic data comprises income data.

14. The method of claim 12, wherein the socio-demographic data comprises education data.

15. The method of claim 1, wherein the plurality of types of data further comprises physical residence attributes.

16. The method of claim 1, wherein the customer adoption status is an adoption status of an energy efficiency program.

17. The method of claim 1, wherein the advertisements include elements to which the customers in the segments are responsive.

18. The method of claim 1, wherein the segments comprise pre-defined partitions of the plurality of customers hypothesized to be homogenous with respect to one or more attributes.

19. The method of claim 1, wherein the algorithm is a bisection algorithm configured to evaluate a linear-fractional function.

20. One or more non-transitory computer storage media storing instructions that are operable, when executed by one or more computers, to cause the one or more computers to perform operations comprising:
- accessing a customer record for each of a plurality of customers, wherein each customer record comprises a plurality of types of data, and wherein the plurality of types of data comprise at least resource consumption data;
- determining, for each of the plurality of customers and based on the customer records, a customer adoption status;
- generating an initial pattern set by traversing a decision tree, wherein each node of the decision tree defines a threshold data value or a range of data values for one of the plurality of types of data in the customer records;
- pruning the initial pattern set by removing patterns that are either ineffective or duplicative;
- assigning remaining patterns that have not been removed by the pruning to segments using an algorithm that iteratively maximizes a minimum effectiveness of the segments, wherein the effectiveness of a segment is a measure of a number of customer records that match the patterns assigned to the segment that have a positive adoption status, and wherein a customer record that matches multiple of the remaining patterns is assigned a weight that indicates a fractional coverage of each of the multiple patterns; and
- using the segments for targeted customer engagement, by selectively formulating and transmitting advertisements to only the customers matching the patterns of a corresponding segment, in order to increase marketing effectiveness.

21. A system comprising one or more computers and one or more storage devices storing instructions that are operable, when executed by the one or more computers, to cause the one or more computer to perform operations comprising:
- accessing a customer record for each of a plurality of customers, wherein each customer record comprises a plurality of types of data, and wherein the plurality of types of data comprise at least resource consumption data;
- determining, for each of the plurality of customers and based on the customer records, a customer adoption status;
- generating an initial pattern set by traversing a decision tree, wherein each node of the decision tree defines a threshold data value or a range of data values for one of the plurality of types of data in the customer records;
- pruning the initial pattern set by removing patterns that are either ineffective or duplicative;
- assigning remaining patterns that have not been removed by the pruning to segments using an algorithm that iteratively maximizes a minimum effectiveness of the segments, wherein the effectiveness of a segment is a measure of a number of customer records that match the patterns assigned to the segment that have a positive adoption status, and wherein a customer record that matches multiple of the remaining patterns is assigned a weight that indicates a fractional coverage of each of the multiple patterns; and
- using the segments for targeted customer engagement, by selectively formulating and transmitting advertisements to only the customers matching the patterns of a corresponding segment, in order to increase marketing effectiveness.

* * * * *